(12) United States Patent
Yoshino

(10) Patent No.: US 8,570,931 B2
(45) Date of Patent: Oct. 29, 2013

(54) REPEATER, WIRELESS COMMUNICATION SYSTEM, CONTROL METHOD AND RECORDING MEDIUM

(75) Inventor: Kimitoshi Yoshino, Osaka (JP)

(73) Assignee: Icom Incorporated, Osaka (JP)

( * ) Notice: Subject to any disclaimer, the term of this patent is extended or adjusted under 35 U.S.C. 154(b) by 509 days.

(21) Appl. No.: 12/431,552

(22) Filed: Apr. 28, 2009

(65) Prior Publication Data

US 2009/0268659 A1    Oct. 29, 2009

(30) Foreign Application Priority Data

Apr. 28, 2008    (JP) .................................. 2008-116925

(51) Int. Cl.
*H04J 1/10*    (2006.01)
*H04J 3/08*    (2006.01)
*H04L 12/54*    (2013.01)

(52) U.S. Cl.
USPC ............ 370/315; 370/349; 370/428; 370/492

(58) Field of Classification Search
None
See application file for complete search history.

(56) References Cited

U.S. PATENT DOCUMENTS

| | | | |
|---|---|---|---|
| 6,754,495 B2 * | 6/2004 | Kusaki et al. ................ | 455/436 |
| 8,184,632 B1 * | 5/2012 | Hui et al. ..................... | 370/392 |
| 2003/0109265 A1 * | 6/2003 | Yamamoto et al. ........... | 455/456 |
| 2004/0038665 A1 * | 2/2004 | Hosono ....................... | 455/404.2 |
| 2004/0114576 A1 * | 6/2004 | Itoh et al. ..................... | 370/352 |
| 2004/0117498 A1 * | 6/2004 | Hashimoto et al. .......... | 709/230 |
| 2008/0095163 A1 * | 4/2008 | Chen et al. ................... | 370/392 |
| 2008/0247355 A1 * | 10/2008 | Ahn ............................ | 370/328 |
| 2008/0267116 A1 * | 10/2008 | Kang et al. ................... | 370/328 |
| 2009/0028129 A1 * | 1/2009 | Pi et al. ........................ | 370/351 |
| 2009/0254790 A1 * | 10/2009 | Pi et al. ........................ | 714/748 |
| 2010/0050034 A1 * | 2/2010 | Che et al. ..................... | 714/748 |

FOREIGN PATENT DOCUMENTS

| | | |
|---|---|---|
| JP | 05-075514 | 3/1993 |
| JP | H11-27200 | 1/1999 |
| JP | 2001-186171 | 7/2001 |
| JP | 2003-174479 | 6/2003 |
| JP | 2005-020627 | 1/2005 |
| JP | 2005-130284 | 5/2005 |
| JP | 2005-236632 | 9/2005 |
| JP | 2005-311580 | 11/2005 |
| JP | 2007-295135 | 11/2007 |
| JP | 2008-028671 | 2/2008 |

OTHER PUBLICATIONS

Notification of Reasons for Rejection, issued on Jul. 31, 2012, in Japanese Patent Application No. 2008-116925.

* cited by examiner

*Primary Examiner* — Gregory Sefcheck
*Assistant Examiner* — Ashley Shivers
(74) *Attorney, Agent, or Firm* — Baker & McKenzie, LLP

(57) ABSTRACT

The present invention provides a repeater, a wireless communication system, a control method and a recording medium that can transmit the same signal received by plural repeaters to the recipient wireless communication device without redundancy of the signal. A repeater connected to a network and relaying a communication of a wireless communication device comprises a packet reception unit receiving a packet transmitted from a sender wireless communication device to a recipient wireless communication device from the network or the sender wireless communication device, a transmission unit transmitting the packet received by the packet reception unit to the recipient wireless communication device, a packet storing unit storing the packet to be transmitted to the recipient wireless communication device as a first packet, and a packet selection unit comparing the first packet with a second packet other than the first packet, and discarding the second packet when both packets match under a predetermined condition.

7 Claims, 13 Drawing Sheets

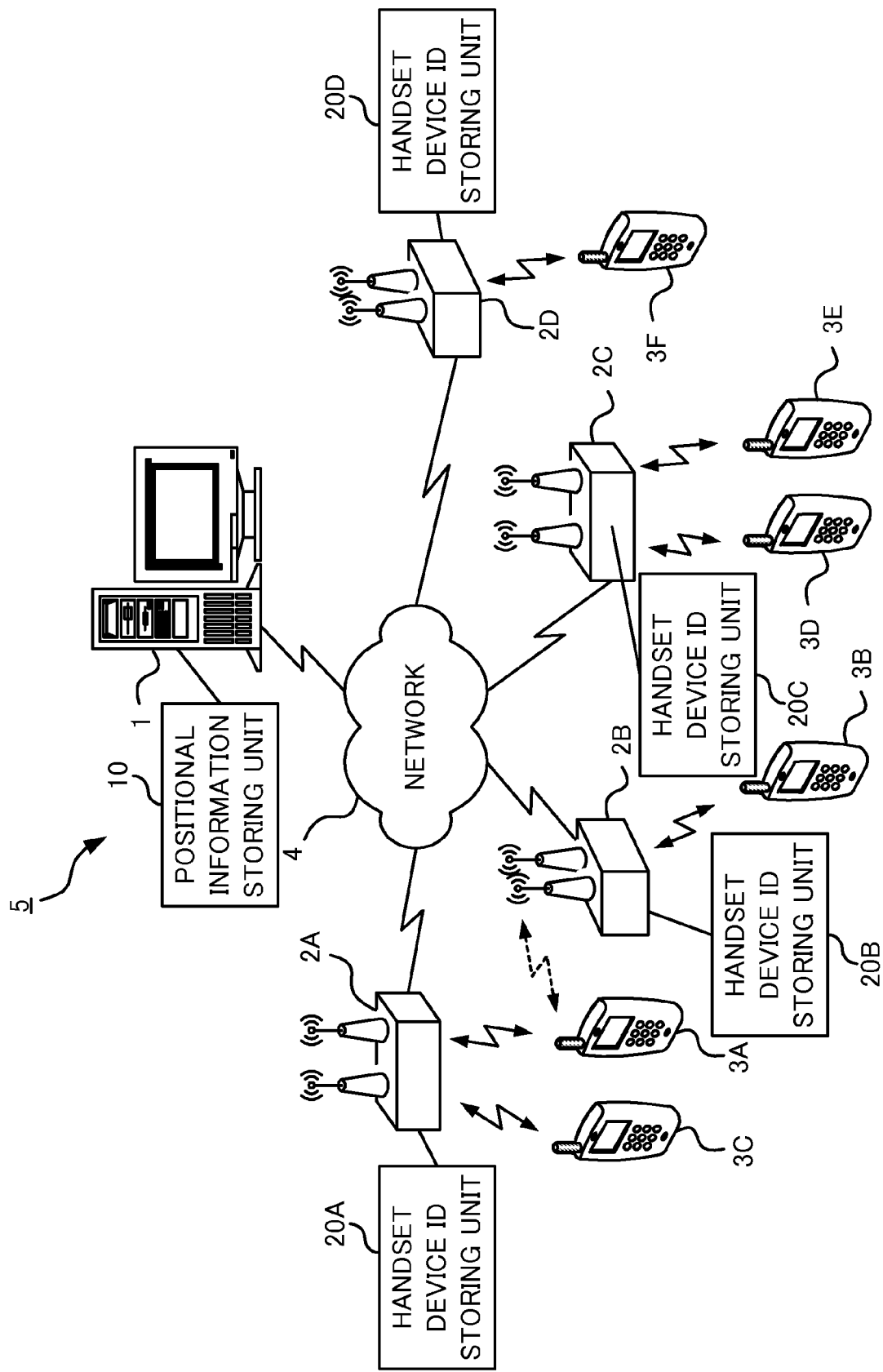

REPEATER, WIRELESS COMMUNICATION SYSTEM, CONTROL METHOD AND RECORDING MEDIUM

BACKGROUND OF THE INVENTION

1. Field of the Invention

The present invention relates to a repeater, a wireless communication system, a control method and a recording medium, and more particularly, a repeater which can transmit the same signal received through plural repeaters to a receiving-side wireless communication device without redundancy of the signal, a wireless communication system, a control method and a recording medium.

2. Description of the Related Art

A repeater simultaneously performs transmission (hereinafter, uplink) from a wireless communication device to a repeater and transmission (hereinafter, downlink) from a repeater to a wireless communication device by changing a frequency or a time slot, thereby permitting a wireless communication between wireless communication devices through itself.

A communication area having plural repeater covering areas (hereinafter, repeater areas) can be constituted by connecting plural repeaters together over a network and using those as one wireless communication system. According to such a wireless communication system, in general, a communication channel (frequency in uplinking or downlinking) is set for each repeater. A wireless communication device selects the communication channel of a repeater which constitutes a repeater area where the wireless communication device itself is present. That is, the wireless communication device awaits a calling from another wireless communication device at a downlink frequency of the repeater, and calls another wireless communication device at an uplink frequency of the repeater.

When the wireless communication device calls another wireless communication device via the repeater, the wireless communication device specifies a repeater constituting a repeater area where a destination wireless communication device is present, and causes a repeater constituting a repeater area where the wireless communication device is present to transmit a call activation signal via the communication channel of the repeater.

Traffic increases when there are plural repeaters having the same channel within a range where a radio wave from one wireless communication device is receivable. For example, Unexamined Japanese Patent Application KOKAI Publication No. H05-75514 discloses a technique of detecting a receiving signal level and of discarding the receiving signal when such a level is greater than or equal to a certain level. According to this technique, once data demodulated by a demodulation circuit in a receiving circuit of a wireless repeater station is stored in a control circuit, a carrier sense circuit simultaneously detects a receiving signal level from a demodulated signal from a demodulation circuit. A detected receiving signal level and a predetermined reference signal level are compared with each other, and when it is determined that the receiving signal level is higher than the reference signal level, no transmission order is given to a transmission circuit, and the data stored in the control circuit is discarded. Note that the contents of Unexamined Japanese Patent Application KOKAI Publication No. H05-75514 will be incorporated in this specification by reference.

There is also a problem that a time necessary for relaying becomes longer than necessary as a repeater station holds a signal in order to avoid any signal collision by simultaneous relaying. For example, Unexamined Japanese Patent Application KOKAI Publication No. 2005-20627 discloses a technique of suppressing any collision of frames to be relayed. According to this technique, a wireless repeater station which receives a wireless signal transmitted from a transmitter is used as a wireless relaying procedure starting station, and frames to be relayed are successively transmitted to another wireless repeater station, connected to the wireless relaying procedure starting station via first and second connection units, using wireless signals, while transferring the frames with wired signals. When transferring of the frames to be relayed with wired signals takes a round through all wireless repeater stations in the system and the relayed frames are transmitted from all wireless repeater stations with wireless signals, a wireless relaying procedure is terminated. Note that the contents of Unexamined Japanese Patent Application KOKAI Publication No. 2005-20627 will be incorporated in this specification by reference.

FIG. 13 is a diagram for explaining one specific example of a communication procedure in a conventional wireless communication system. More specifically, communication procedures in a case where two repeaters 2A, 2B having the same channel (frequency) receives a voice signal from the same wireless communication device (handset device) 3A is shown in the figure. The repeaters 2A and 2B individually receive voice signals from the handset device 3A. Next, the repeaters 2A and 2B individually transmit a positional information registration packet (hereinafter, registration packet) including the ID of the handset device 3A (hereinafter, sender ID) and a repeater inquiring packet (hereinafter, inquiring packet) including the ID of a transmission-destination handset device 3D (hereinafter, recipient ID) to a server 1.

As the server 1 receives the registration packet, the server 1 transmits a position registration ACK (acknowledgement) to the repeaters 2A, 2B, respectively. As the server 1 receives the inquiring packet, the server 1 transmits a repeater inquiring respondence packet (hereinafter, respondence packet) including the ID of a repeater 2C (hereinafter, recipient repeater ID) stored correspondingly to the recipient ID in the inquiring packet to the repeaters 2A and 2B, respectively.

The repeaters 2A and 2B individually transmit a voice signal having the same content to the repeater 2C specified by the recipient ID in the respondence packet (procedures P31 and P32). The repeater 2C transmits voice signals redundantly transmitted from the repeaters 2A and 2B, respectively, to the handset device 3D (procedures P33 and P34).

In this fashion, in a wireless communication system provided with plural repeaters 2A and 2B having the same channel (frequency), the plural repeaters 2A and 2B simultaneously receive a voice signal transmitted from the wireless communication device (handset device) 3A, and transmit the voice signal to the handset device 3D via the repeater 2C. When the repeaters 2A to 2C are connected together via wires, the same voice signals are transmitted from the plural repeaters 2A and 2B to the same repeater 2C via a wired circuit. As the repeater 2C receives the same voice signals redundantly, a voice output from the handset device 3D becomes abnormal. For example, when a voice input into the handset device 3A is "a, b, c, d, e", the handset device 3D outputs a redundant voice like "aa, bb, cc, dd, ee".

As explained above, when there are plural repeaters 2A and 2B having the same channel (frequency) in plural repeaters, as the repeaters 2A and 2B simultaneously receive voice signals, the same voice signals are redundantly transmitted to the handset device 3D. If all repeaters having the different channels (frequencies) are set, such a phenomenon does not occur, but as a large number of channels are used, intermodulation may occur. Moreover, the number of channels for the repeaters is limited (e.g., total of 27 channels in a specified low power wireless communication), so that it is not possible to use the repeaters simultaneously greater than or equal to the number of channels.

The present invention has been made in view of the foregoing circumstances, and it is an object of the present invention to provide a repeater which can transmit the same signal received through plural repeaters to a receiving-side wireless communication device without redundancy of the signal, a wireless communication system, a control method and a recording medium.

SUMMARY OF THE INVENTION

In order to achieve the object, a repeater according to the first aspect of the present invention is connected to a network, relays a communication of a wireless communication device, and comprises: a packet reception unit that receives a packet transmitted from a sender wireless communication device to a recipient wireless communication device from the network or the wireless communication device; a transmission unit that transmits the packet received by the packet reception unit to the recipient wireless communication device which is a transmission destination; a packet storing unit that stores, as a first packet, all of or a predetermined part of the packet transmitted to the recipient wireless communication device; and a packet selection unit that compares all of or a predetermined part of the first packet stored by the packet storing unit with all of or a predetermined part of a second packet, other than the first packet received by the packet reception unit, and discards the second packet when the first and second packets match under a predetermined condition.

Preferably, the packet selection unit determines that the first packet and the second packet match when a rate that all of or a predetermined part of the first packet and all of or a predetermined part of the second packet match is greater than or equal to a predetermined value.

More preferably, when a predetermined time elapses after the packet storing unit stores the first packet, the packet selection unit excludes all of or a predetermined part of the stored first packet from a comparison target with all of or a predetermined part of the second packet.

Preferably, when the packet reception unit receives a packet which has the same destination as the first packet and which does not match the first packet under a predetermined condition, the packet selection unit excludes all of or a predetermined part of the stored first packet from a comparison target with all of or a predetermined part of the second packet.

Preferably, when the packet reception unit receives a second packet matching the first packet under a predetermined condition prior to transmitting the fist packet, the packet selection unit compares an error rate of the first packet with an error rate of the second packet, and replaces the first packet stored in the packet storing unit with the second packet when the second packet has a smaller error rate than the error rate of the first packet.

According to the second aspect of the present invention, a method of controlling a repeater which is connected to a network and which relays a communication of a wireless communication device, the method comprising: a packet reception step of receiving a packet transmitted from a sender wireless communication device to a recipient wireless communication device from the network or the wireless communication device; a transmission step of transmitting the packet received in the packet reception step to the recipient wireless communication device; a packet storing step of storing, as a first packet, all of or a predetermined part of the packet transmitted to the recipient wireless communication device; and a packet selection step of comparing all of or a predetermined part of the first packet stored in the packet storing step with all of or a predetermined part of a second packet, other than the first packet received in the packet reception step, and discarding the second packet when the first and second packets match under a predetermined condition.

A wireless communication system according to the third aspect of the present invention comprises sender and recipient repeaters connected to a network, and sender and recipient wireless communication devices which communicate with each other via the repeaters, wherein: the network transmits data or a packet between the sender and recipient repeaters; the sender repeater comprises: a reception unit that receives a packet transmitted from the sender wireless communication device to the recipient wireless communication device: an acquisition unit that acquires identification information of the recipient repeater having a communication area where the recipient wireless communication device which is a destination of the packet received from the sender wireless communication device is present; and a transmission unit that transmits the received packet to the sender repeater specified by the identification information acquired by the acquisition unit via the network when the recipient repeater specified by the identification information differs from itself, the recipient repeater comprises: a packet reception unit that receives a packet transmitted from the sender wireless communication device to the recipient wireless communication device from the network or the wireless communication device; a transmission unit that transmits the packet received by the packet reception unit to the recipient wireless communication device which is a destination of the packet; a packet storing unit that stores, as a first packet, all of or a predetermined part of the packet transmitted to the recipient wireless communication device; and a packet selection unit that compares all of or a predetermined part of the first packet stored by the packet storing unit with all of or a predetermined part of a second packet, other than the first packet received by the packet reception unit, and discards the second packet when the first and second packets match under a predetermined condition.

Preferably, the wireless communication system further comprises a positional information server that communicates with the repeaters, and wherein the positional information server comprises: a positional information storing unit that stores identification information of the wireless communication device in association with identification information of the recipient repeater which can communicate with the wireless communication device; a reception unit that receives an inquiry of searching identification information of the recipient repeater having a communication area where the recipient wireless communication device which is a destination of the packet is present from the transmission repeater; a respondence unit that transmits identification information of the recipient repeater which can communicate with the wireless communication device to the repeater which transmits the inquiry when the inquiry is received, the identification information being stored in the positional information storing unit and corresponding to identification information of the sender wireless communication device contained in the inquiry; the acquisition unit of the recipient repeater transmits an inquiry of searching identification information of the recipient repeater having a communication area where the recipient wireless communication device which is a destination of the packet is present to the positional information server, and acquires, from the positional information server, identification information of the recipient repeater having a communication area where the recipient wireless communication device is present.

A computer-readable recording medium according to the fourth aspect of the present invention stores a control program for a repeater connected to a network and relays a communication of a wireless communication device, the control program allowing a computer to function as: a packet reception unit that receives a packet transmitted from a sender wireless communication device to a recipient wireless communication device from the network or the wireless communication device; a transmission unit that transmits the packet received by the packet reception unit to the recipient wireless communication device which is a destination of the packet; a packet storing unit that stores, as a first packet, all of or a predetermined part of the packet transmitted to the recipient wireless communication device; and a packet selection unit that compares all of or a predetermined part of the first packet stored by the packet storing unit with all of or a predetermined part of a second packet, other than the first packet received by the packet reception unit, and discards the second packet when the first and second packets match under a predetermined condition.

According to the repeater, the wireless communication system, the control method and the recording medium of the present invention, it is possible to transmit the same signal received through plural repeaters to a recipient wireless communication device without redundancy of the signal.

BRIEF DESCRIPTION OF THE DRAWINGS

The object and other objects and advantages of the present invention will become more apparent upon reading of the following detailed description and the accompanying drawings in which:

FIG. 1 is a diagram showing a configuration example of a wireless communication system;

DETAILED DESCRIPTION OF THE PREFERRED EMBODIMENT

Figure 2A:
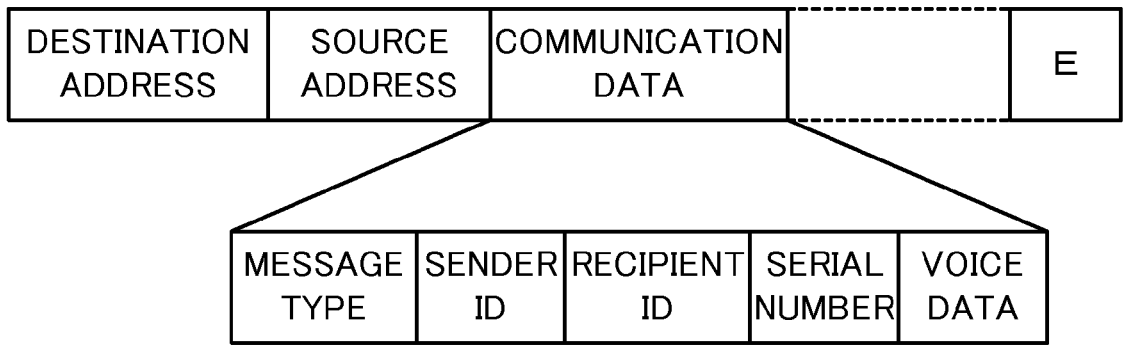
FIG. 2A is a diagram showing a configuration example of a communication information packet.

An explanation will be given of an embodiment of the present invention with reference to accompanying drawings. Note that the same structural components or corresponding components in the drawings will be denoted by the same reference numbers, and the explanation thereof will be omitted. In the embodiment, an explanation will be given of a wireless communication system using a repeater which discards a redundant voice packet.

FIG. 1 is a diagram showing a configuration example of a wireless communication system 5 according to the embodiment. As shown in FIG. 1, the wireless communication system 5 comprises a server 1, plural repeaters 2A to 2D, plural wireless communication devices (hereinafter called handset devices) 3A to 3F, and a network 4. In the wireless communication system 5, the server 1 and the individual repeaters 2A to 2D are mutually connected together via the network 4.

The server 1 controls the wireless communication system 5 overall, and comprises, for example, a frame work or a work station. The server 1 has a positional information storing unit 10 that stores positional information having the individual IDs (Identification Data) of the repeaters 2A to 2D registered in association with the individual IDs of the handset devices 3A to 3F present in areas (repeater areas) where the repeaters 2A to 2D can communicate.

Positional information has, for example, the ID of the repeater 2A registered in association with the ID of the handset device 3A and 3C, the ID of the repeater 2B registered in association with the ID of the handset device 3A and 3B, the ID of the repeater 2C registered in association with the IDs of the handset devices 3D and 3E, and the ID of the repeater 2D registered in association with the ID of the handset device 3F.

When receiving a positional information registration packet (hereinafter, registration packet) including the ID (hereinafter, sender ID) of the handset device 3A to 3F, which is a transmission source, from the repeater 2A to 2D via the network 4, the server 1 updates the positional information stored in the positional information storing unit 10.

A registration packet is transmitted to the server 1 from the repeater 2A to 2D via the network 4 when the ID of the handset device 3A to 3F stored in the repeater 2A to 2D is updated. Note that a registration packet may be periodically transmitted to the server 1 from the repeater 2A to 2D via the network 4. In a case where the handset device 3A to 3F present in the communication area of the repeater 2A to 2D is fixed, positional information may be stored in the positional information storing unit 10 beforehand, and the repeater 2A to 2D may not transmit a registration packet to the server 1.

The server 1 detects the ID (hereinafter, recipient repeater ID) of the repeater 2A to 2D corresponding to the ID (hereinafter, recipient ID) of the handset device 3A to 3F which is a transmission destination included in a repeater inquiring packet (hereinafter, inquiring packet) from the positional information, when receiving the inquiring packet from the repeater 2A to 2D via the network 4. The server 1 transmits a repeater inquiring respondence packet (hereinafter, respondence packet) including the recipient repeater ID detected from the positional information to the repeater 2A to 2D which is the originator of the inquiring packet via the network 4.

The repeater 2A to 2D has a handset device ID storing unit 20A to 20D which stores the ID of the handset device 3A to 3F present in its communication area. For example, the repeater 2A stores the IDs of the handset devices 3A and 3C in the handset device ID storing unit 20A, the repeater 2B stores the IDs of the handset devices 3A and 3B in the handset device ID storing unit 20B, the repeater 2C stores the IDs of the handset devices 3D and 3E in the handset device ID storing unit 20C, and the repeater 2D stores the ID of the handset device 3F in the handset device ID storing unit 20D.

When receiving a call-request signal from the handset device 3A to 3F, the repeater 2A to 2D stores the ID of the transmission-source handset device 3A to 3F in the handset device ID storing unit 20A to 20D as the ID of the handset device 3A to 3F present in its communication area. Note that the repeater 2A to 2D may store the ID of the handset device 3A to 3F present in its communication area in the handset device ID storing unit 20A to 20D beforehand, or may collect the ID periodically, and may store the ID of the handset device 3A to 3F in the handset device ID storing unit 20A to 20D.

When the ID of the handset device 3A to 3F stored in the handset device ID storing unit 20A to 20D is updated, the repeater 2A to 2D transmits a registration packet including the updated ID of the handset device 3A to 3F to the server 1 via the network 4. Note that the repeater 2A to 2D may periodically transmit a registration packet to the server 1 via the network, or may transmit a registration packet to the server 1 via the network 4 in response to an inquiry from the server 1. Moreover, the repeater 2A to 2D may transmit a registration packet to the server 1 via the network 4 in response to a registration request signal from the handset device 3A to 3F.

The repeater 2A to 2D acquires a recipient ID from a call-request signal transmitted from the transmission-source handset device 3A to 3F, and specifies the transmission-destination handset device 3A to 3F. In a case where the repeater 2A to 2D stores the ID of the handset device 3A to 3F, matching the recipient ID acquired from the call-request signal, in the handset device ID storing unit 20, i.e., in a case where the transmission-destination handset device 3A to 3F is present in the communication area of the repeater 2A to 2D, the repeater 2A to 2D transmits the calling signal to the transmission-destination handset device 3A to 3F.

Conversely, in a case where the repeater 2A to 2D does not store the ID of the handset device 3A to 3F, which does not match the recipient ID acquired from the call-request signal, in the handset device ID storing unit 20A to 20D, i.e., in a case where no transmission-destination handset device 3A to 3F is present in the communication area of the repeater 2A to 2D, the repeater 2A to 2D transmits an inquiring packet including the recipient ID to the server 1 via the network 4. The repeater 2A to 2D acquires a recipient repeater ID from a respondence packet having transmitted as a response from the server 1, and transmits a calling activation signal (hereinafter, calling packet) to the repeater 2A to 2D specified by the recipient repeater ID via the network 4. In this fashion, the repeater 2A to 2D acquires a recipient repeater ID, thereby specifying an address uniquely set for each repeater 2A to 2D on the network 4.

The repeater 2A to 2D performs reception (hereinafter, uplink) from the handset device 3A to 3F and transmission (hereinafter, downlink) to the handset device 3A to 3F simultaneously at different frequencies. Note that the repeater 2A to 2D may doubly perform uplinking and downlinking by time shearing.

The repeater 2A to 2D has one or plural channels (hereinafter, simultaneous communication channels) which allow simultaneous wireless communication that is a set of uplinking and downlinking. The number of the simultaneous communication channels is defined on the basis of the structure of the repeater 2A to 2D. In the embodiment, the repeater 2A to 2D has a simultaneous communication channel at the same frequency.

The handset device 3A to 3F is a mobile station which performs wireless communication via the repeater 2A to 2D. Note that the handset device 3A to 3F may be a fixed station.

In a case where the transmission-source handset device 3A to 3F and the transmission-destination handset device 3A to 3F are present in the same communication area of the repeater 2A to 2D, a wireless communication between the handset devices 3A to 3F is carried out through the repeater 2A to 2D. For example, a wireless communication between the handset device 3A and the handset device 3C is carried out through the repeater 2A. Conversely, in a case where the transmission-source handset device 3A to 3F and the transmission-destination handset device 3A to 3F are present in different communication areas of the different repeater 2A to 2D, a wireless communication between the handset devices 3A to 3F is carried out through the repeater 2A to 2D and the network 4. For example, a wireless communication between the handset device 3A and the handset device 3D is carried out through the repeater 2A, the network 4, and the repeater 2C.

The network 4 is a wired/wireless network like a LAN (Local Area Network), and is connected to the server 1 and the repeater 2A to 2D. Note that the network 4 may be the other kind of wired/wireless network, such as a line switching network, a packet switching network, the Internet, or an exclusive line network, and for example, may be a wireless communication network like a wireless LAN.

Figure 2B:
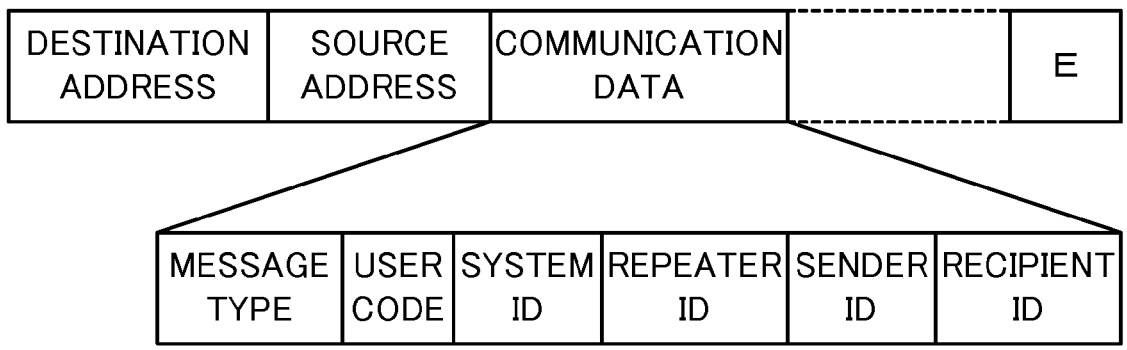
FIG. 2B is a diagram showing a configuration example of an inquiring packet.
Figure 2C:
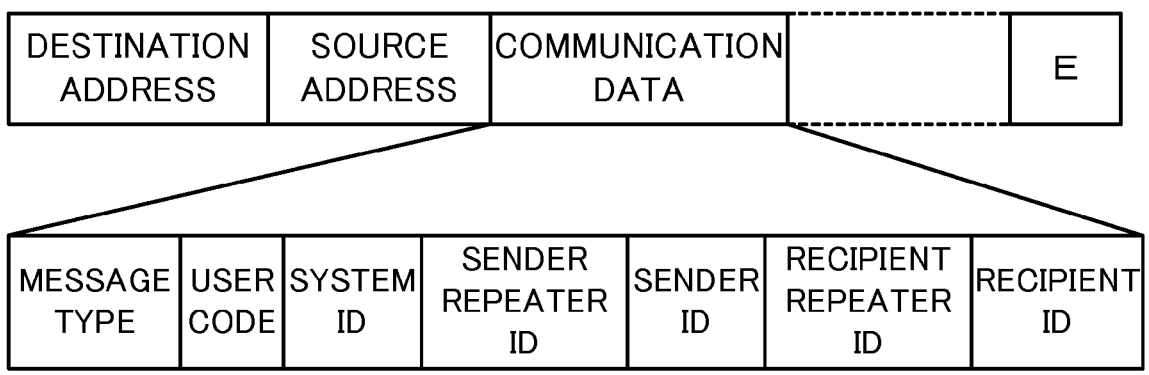
FIG. 2C is a diagram showing a configuration example of a respondence packet.

FIGS. 2A to 2C are diagrams showing a configuration example of a packet transmitted via the network 4. Note that a "packet" means control information, such as identification information of a transmission source (sender) and a transmission destination (recipient), a kind of a packet, and a serial number for combining packets, added to each data piece when large data is divided into plural data pieces to be transmitted.

FIG. 2A is a diagram showing a configuration example of a packet (hereinafter, communication information packet) transmitted between repeaters via the network 4. The communication information packet includes a transmission-source address, a transmission-destination address and communication data as shown in FIG. 2A.

In the communication information packet, the transmission-destination address is an address, on the network 4, of a repeater 2A to 2D, serving as the destination of a communication information packet. The transmission-source address is an address, on the network 4, of the repeater 2A to 2D serving as the source of the communication information. Note that the transmission-destination address or the transmission-source address may be an IP (Internet Protocol) address when the network 4 is the Internet or an intranet.

Communication data represents the content of a voice packet transmitted from the handset device 3A to 3F from the repeater 2A to 2D, and contains a message type, a sender ID, a recipient ID, a serial number, and voice data.

In the communication information packet, a code indicating that the communication information packet is a communication information packet is written in the message type. The serial number indicates the order of communication packets to be decoded. 1 octet data indicating a number from "0" to "255" as a serial number is allocated to the communication data in the decoding order. When the serial number exceeds "255", numbers from "0" again are successively and repeatedly added to communication data. Note that a serial number may not be added to communication data, and in this case, the repeater 2A to 2D may decode or transmit communication information packet in the order of reception.

FIG. 2B is a diagram showing a configuration example of an inquiring packet. As shown in FIG. 2B, the inquiring packet contains a transmission-destination address, a transmission-source address, and communication data. In the inquiring packet, the transmission-destination address is the address, on the network 4, of the server 1, and the transmission-source address is the address of the repeater 2A to 2D serving as the originator of the inquiring packet.

Communication data contains a message type, a user code, a system ID, a repeater ID, a sender ID, and a recipient ID. A code indicating that the packet is an inquiring packet is written as the message type. The ID of the repeater 2A to 2D which is the transmission source of the inquiring packet is written as the repeater ID.

FIG. 2C is a diagram showing a configuration example of a respondence packet. As shown in FIG. 2C, the respondence packet contains a transmission-destination address, a transmission-source address, and communication data. In the respondence packet, the transmission-destination address, on the network 4, is the ID of the repeater 2A to 2D serving as a transmission source of the inquiring packet, and the transmission-source address is the address of the server 1 on the network 4.

Communication data contains a message type, a user code, a system ID, a sender repeater ID, a sender ID, a recipient repeater ID, and a recipient ID. A code indicating that the packet is a respondence packet is written as the message type. The ID of the repeater 2A to 2D which is the transmission source of the inquiring packet is written in the sender repeater ID. The ID of the repeater 2A to 2D registered in the positional information in association with the recipient ID is written in the recipient repeater ID.

Figure 3:
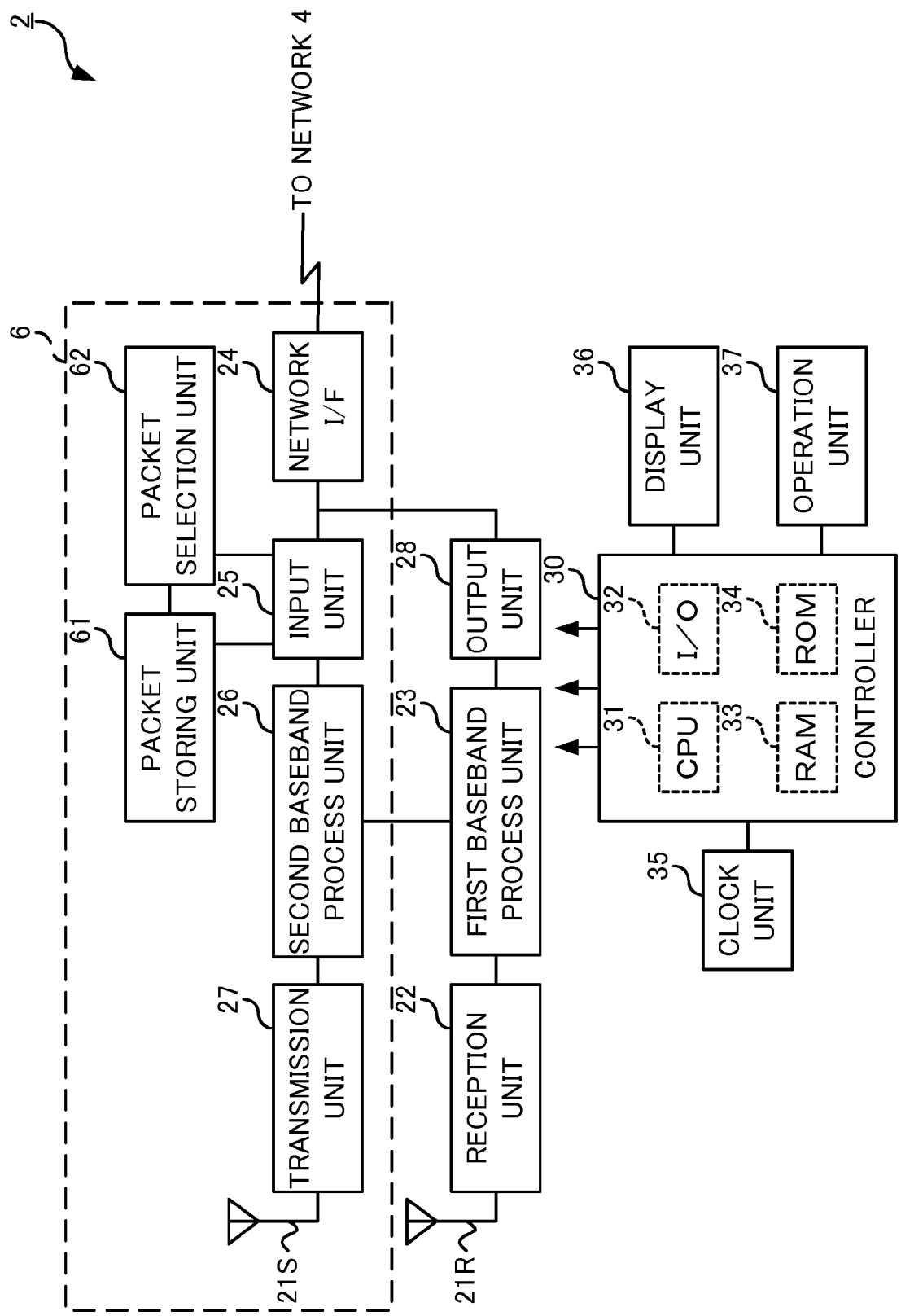
FIG. 3 is a block diagram showing a configuration example of a repeater.

FIG. 3 is a block diagram showing a configuration example of the repeater. In addition to the handset device ID storing unit 20 shown in FIG. 1, as shown in FIG. 3, the repeater 2 (2A to 2D) has an antenna 21R, an antenna 21S, a reception unit 22, a first baseband process unit 23, a network interface (hereinafter, network I/F) 24, an input unit 25, a second baseband process unit 26, a transmission unit 27, an output unit 28, a controller 30, a clock unit 35, a display unit 36, an operation unit 37, a packet storing unit 61, and a packet selection unit 62.

The reception unit 22 has a tuning function of selecting a radio wave at a frequency band set by the controller 30 among radio waves input through the antenna 21R, thereby receiving a radio signal, such as a call-request signal or a voice signal (hereinafter, voice packet) transmitted from the handset device 3 (3A to 3F).

The first baseband process unit 23 extracts various kinds of data from the radio signal received by the reception unit 22, and supplies the extracted data to the controller 30. The first baseband process unit 23 supplies communication data or the like extracted from a voice packet to the second baseband process unit 26 when transmitting the voice data to a handset device 3 present in the communication area of the repeater 2.

The network I/F 24 outputs a calling packet and a communication information packet to another repeater 2 via the network 4, and accepts inputting of a calling packet and a communication information packet transmitted from another repeater 2 via the network 4.

The input unit 25 extracts various kind of data from a calling packet and a communication information packet received through the network I/F 24 via the network 4, and supplies the extracted data to the controller 30. The input unit 25 supplies various data extracted from a communication information packet, such as a transmission-destination address, a transmission-source address and communication data, to the second baseband process unit 26 when transmitting a voice packet to a handset device 3 present in a communication area of the repeater 2.

By having the antenna 21R, the reception unit 22, the first baseband process unit 23, the network I/F 24, and the input unit 25, the repeater 2 can have a reception function that enables reception of a radio signal transmitted (uplinked) from a handset device 3, and reception of a calling packet and a communication packet received through the network I/F 24 via the network 4.

The second baseband process unit 26 assembles a control signal like a voice packet in order to execute a communication protocol. For example, the second baseband process unit 26 adds a preamble, an SW (synchronization word), and an RI (radio information channel) to data supplied from the first baseband process unit 23 and the input unit 25 to assemble a voice packet, and outputs the assembled voice packet to the transmission unit 27.

The transmission unit 27 performs a process of modulating a voice packet input from the second baseband process unit 26 and a calling signal input from the controller 30 using a modulation scheme, such as GMSK (Gaussian filtered Minimum Shift Keying), PSK (Phase Shift Keying), QAM (Quadrature Amplitude Modulation), or FSK (Frequency Shift Keying), and transmits the modulated data to a handset device 3 via the antenna 21S.

The output unit 28 generates a registration packet.

By having the antenna 21S, the network I/F 24, the second baseband process unit 26, the transmission unit 27 and the output unit 28, the repeater 2 can have a transmission function that enables transmission (downlinking) of a voice packet received through the reception unit 22 and a communication information packet received through the network I/F 24 via the network 4 to a handset device 3.

The controller 30 controls the operation of each unit in the repeater 2, and comprises, for example, a CPU (Central Processing Unit) 31, an I/O (Input/Output) device 32, a ROM (Read Only Memory) 34, a RAM (Random Access Memory) 33 and an internal bus (not shown) connecting those together.

The controller 30 is connected to the clock unit 35, the display unit 36, and the operation unit 37 via the I/O device 32. In FIG. 3, signal lines are omitted in order to avoid complexity of the drawing and to facilitate understanding, but the controller 30 is connected to the reception unit 22, the first baseband process unit 23, the network I/F 24, the input unit 25, the second baseband process unit 26, the transmission unit 27, and the output unit 28 via the I/O device 32, and controls the start and the end of processes executed by those units and the contents of those processes. For example, the controller 30 controls the operation of the second baseband process unit 26, the start and the end of a transmission by the transmission unit 28, and selection of a frequency.

The RAM 33 stores data for controlling transmission of a calling signal or a voice packet, a registration packet to be transmitted by the repeater 2, data for creating a calling packet and a communication information packet, and data for setting a preamble, the length of an SW, RI, SACCH (Slow Associated Control CHannel), and PICH (Parameter Information CHannel). Note that PICH is parameter information which contains an address of the server 1 or the repeater 2 on the network 4 and the ID of another repeater 2 and which is data for constituting the header portion of a registration packet, a calling packet, and a communication information packet.

The RAM 33 is provided with a reception flag, a memory flag, and a time counter.

The reception flag is set to be ON when the repeater 2 receives a calling packet from another repeater 2, and is cleared and set to be OFF when the repeater 2 receives a response (answerback) from a handset device 3 which is a transmission destination of a calling signal.

The memory flag is set to be ON when the packet storing unit 61 stores a voice packet, and is cleared and set to be OFF when the packet storing unit 61 discards a voice packet.

The time counter is for counting a time from when a voice packet is stored in the packet storing unit 61, and when a voice packet is stored in the packet storing unit 61, a count value corresponding to a period set through the operation unit 37 by an operator is set as an initial value. The time counter has a count value decremented one by one every time the clock unit 35 counts a predetermined period.

The ROM 34 stores a control program.

By executing the control program stored in the ROM 34, the CPU 31 controls the operation of the repeater 2.

For example, when the ID of a handset device 3 contained as a sender ID in a calling signal is not stored in the handset device ID storing unit 20, the CPU 31 causes the output unit 28 to generate a registration packet, and to output the registration packet to the server 1 through the network I/F 24 via the network 4. Note that the CPU 31 may cause the output unit 28 to generate a registration packet and to transmit the registration packet to the server 1 through the network I/F 24 via the network 4 when the reception unit 22 receives a registration request signal from the handset device 3.

The CPU 31 causes the transmission unit to transmit a calling signal to a handset device 3 based on a recipient ID contained in a call-request signal received by the reception unit 22, and causes the output unit 28 to transmit a calling packet to another repeater 2 through the network I/F 24 via the network 4.

More specifically, when a recipient ID contained in a call-request signal is stored in the handset device ID storing unit 20 shown in FIG. 1, the CPU 31 determines that a transmission-destination handset device 3 is present in the communication area of the repeater 2, and causes the output unit 28 to transmit a calling signal to the transmission-destination handset device 3.

Conversely, when a recipient ID contained in a call-request signal is not stored in the handset device ID storing unit 20 shown in FIG. 1, the CPU 31 determines that a transmission-destination handset device 3 is not present in the communication area of the repeater 2, and causes the output unit 28 to transmit an inquiring packet containing the recipient ID to the server 1 through the network I/F 24 via the network 4. Thereafter, the CPU 31 causes the output unit 28 to transmit a calling packet to a repeater 2 specified by a recipient ID contained in a respondence packet received through the network I/F 24 and the input unit 25.

By having the reception unit 22, the first baseband process unit 23, the network I/F 24, the output unit 28, and the controller 30, the repeater 2 can have an inquiring packet transmission function of transmitting an inquiring packet and a positional information registration function of registering the ID of a handset device 3 present in a communication area of the repeater 2 in positional information.

Further, the CPU 31 causes the transmission unit 27 to transmit a calling signal to a handset device 3 specified by a recipient ID contained in a calling packet received through the network I/F 24 and the input unit 25.

When both transmission-source handset device 3 and transmission-destination handset device 3 are present in the same communication area of the repeater 2, the CPU 31 causes the transmission unit 27 to transmit a voice packet received by the reception unit 22 to the transmission-destination handset device 3 specified by a recipient ID contained in the voice packet.

Conversely, When only a transmission-source handset device 3 is present in the communication area of the repeater 2, the CPU 31 causes the output unit 28 to transmit a communication information packet containing the content of a voice packet received by the reception unit 22 to a repeater 2 specified by a recipient repeater ID through the network I/F 24 via the network 4.

On the other hand, When only a transmission-destination handset device 3 is present in the communication area of the repeater 2, the CPU 31 causes the second baseband process unit 26 to assemble a voice packet from a communication information packet received through the network I/F 24 and the input unit 25, and causes the transmission unit 27 to transmit the voice packet to the transmission-destination handset device 3 specified by a recipient ID contained in the communication information packet.

The clock unit 35 counts a transmission timing or the like when the CPU 31 transmits a predetermined annunciation information at a predetermined period.

The display unit 36 comprises, for example, a CRT (Cathode Ray Tube), an LCD (Liquid Crystal Display), or LEDs (Light Emission Diodes), and displays various information, such as a communication state between the repeater 2 and the handset device 3 over the network 4, and a communication mode.

The operation unit 37 is for inputting condition information for the operation of the repeater 2, and is provided with various kinds of operation keys. As the operator operates the operation keys of the operation unit 37 of the repeater 2 to input an operational condition, it is possible to cause the repeater 2 to do operation based on the input condition.

For example, as the operator operates the operation keys of the operation unit 37, it is possible to select and set an operational mode, such as an On-line operational mode that the repeater 2 is connected to the network 4, or a stand-alone operational mode that the repeater 2 is not connected to the network 4.

Moreover, as the operator operates the operation keys of the operation unit 37, it is possible to set a reference value for a matching rate used when the packet selection unit 62 compares voice packets, and a portion subjected to comparison among voice packets. Note that the reference value of a matching rate can be set or changed arbitrary in accordance with the condition of the communication path of a voice packet.

Further, as the operator operates the operation keys of the operation unit 37, it is possible to set a memory range whether all of a voice packet or a specific portion thereof is stored in the packet storing unit 61 and a discard condition like a period until a voice packet is discarded from the packet storing unit 61.

The packet storing unit 61 comprises, for example, a RAM, and stores all of a part of a voice packet transmitted from the transmission unit 27, correspondingly to the memory range set through the operation unit 37 by the operator. Note that the packet storing unit 61 is not limited to one comprised of a RAM, and may be constituted together with another storing unit in the RAM 33 of the controller 30.

A voice packet stored in the packet storing unit 61 is subjected to comparison with a voice packet assembled by the second baseband process unit 26, and is discarded from the packet storing unit 61 and becomes out of the comparison target when the time counter provided in the RAM 33 becomes time-out.

The packet selection unit 62 compares a voice packet stored in the packet storing unit 61 and a voice packet assembled by the second baseband process unit 26, and determines whether or not both packet match under a predetermined condition.

More specifically, the packet selection unit 62 determines whether or not the matching rate between a voice packet stored in the packet storing unit 61 and a voice packet assembled by the second baseband process unit 26 is greater than or equal to the reference value set through the operation unit 37, and determines whether or not both voice packets match.

The packet selection unit 62 determines whether or not both voice packets match by comparing a portion set through the operation unit 37 by the operator in both voice packets. Note that the packet selection unit 62 may determine whether or not both voice packets match by comparing both voice packets entirely.

More specifically, the packet selection unit 62 compares a sender ID, a recipient ID, and a serial number in both voice packets, thereby determining whether or not both voice packets match. Note that the packet selection unit 62 may compares a portion from a header of communication data contained in both packet and to a portion thereof apart by a predetermined bit number, thereby determining whether or not both voice packets match.

The packet selection unit 62 discards the voice packet assembled by the second baseband process unit 26 when determining that both voice packets match.

Conversely, when determining that both voice packets do not match, the packet selection unit 62 compares respective sender IDs contained in both voice packets, and determines whether or not the transmission-source handset device 3 of both voice packets match.

When determining that the transmission-source handset devices 3 in both voice packets match, the packet selection unit 62 determines that the voice packet stored in the packet storing unit 61 does not have a necessity of comparison, discards that voice packet and the voice packet becomes out of the comparison target. Accordingly, the packet selection unit 62 can suppress any increment of the memory size of the packet storing unit 61.

Thereafter, the packet selection unit 62 writes the voice packet assembled by the second baseband process unit 26 in the packet storing unit 61 as a voice packet to be transmitted at next, thereby updating a comparison-target voice packet. Accordingly, the packet selection unit 62 can efficiently execute a process of selecting a comparison-target voice packet.

By having the antenna 21S, the network I/F 24, the input unit 25, the second baseband process unit 26, the packet storing unit 61, and the packet selection unit 62, the repeater 2 can have a same-packet determination function 6.

That is, the same-packet determination function 6 writes all of or a part of a voice packet assembled by the second baseband process unit 26 in the packet storing unit 61 within a period set through the operation unit 37 by the operator, when transmitting (downlinking) a voice packet to a transmission-destination handset device 3 by a transmission function.

Next, the same-packet determination function 6 determines whether or not the matching rate between a voice packet written in the packet storing unit 61 and a voice packet newly assembled by the second baseband process unit 26 is greater than or equal to the reference value set through the operation unit 37 by the operator.

Thereafter, when determining that the matching rate is greater than or equal to the reference value, the same-packet determination function 6 discards the voice packet newly assembled by the second baseband process unit 26, thereby suppressing any redundant transmission of the same voice packet to a transmission-destination handset device 3.

Note that the same-packet determination function 6 is not limited to exclusive hardwares, such as the packet storing unit 61 and the packet selection unit 62, but can be realized using a general-purpose computer system. For example, using the CPU 31, the I/O device 32, the ROM 34, the RAM 33 and the internal bus (not shown) connecting those together in the controller 30, a computer program for realizing the same-packet determination function 6 may be stored in the ROM 34.

Figure 9:
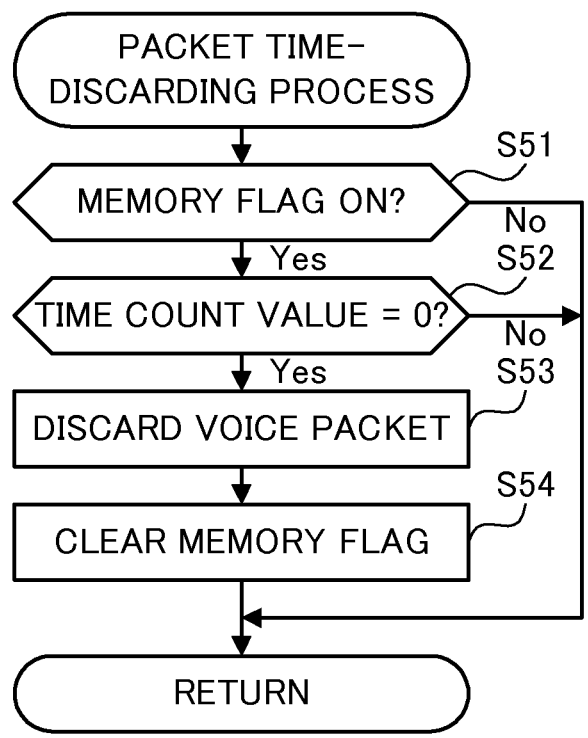
FIG. 9 is a flowchart showing an example of a packet time-discarding process.

Next, an explanation will be given of the redundant transmission suppressive operation of the repeater 2 having the foregoing structure, with reference to the accompanying drawings. In the redundant transmission suppressive operation, a repeater reception selective process shown in FIGS. 4 to 7 and a packet time-discarding process shown in FIG. 9 are periodically executed in response to, for example, a timer interruption.

FIGS. 4 to 7 are flowcharts showing an example of the repeater reception selective process. In the repeater reception selective process, first, the CPU 31 determines whether or not the reception unit 22 receives a radio signal (step S1 shown in FIG. 4), and when having received (step S1: YES), the CPU 31 determines whether or not the received radio signal is a calling signal (step S2).

When the radio signal received in the step S1 is a call-request signal (step S2: YES), the CPU 31 acquires a recipient ID from the call-request signal (step S3), and determines whether or not the ID of a handset device 3 corresponding to the recipient ID is stored in the handset device ID storing unit 20 (step S4).

When the ID of the handset device 3 corresponding to the recipient ID is stored in the handset device ID storing unit 20 (step S4: YES), the CPU 31 causes the transmission unit 27 to transmit a calling signal to the handset device specified by the recipient ID (step S5), and then terminates the repeater selection selective process.

Conversely, when the ID of the handset device 3 is not stored in the handset device ID storing unit 20 (step S4: NO), the CPU 31 causes the output unit 28 to transmit an inquiring packet to the server 1 through the network I/F 24 (step S6), and terminates the repeater reception selective process.

When determining that a radio signal is not received in the step S1 (step S1: NO), the CPU 31 determines whether or not the repeater 2 receives any packets through the network I/F 24 and the input unit 25 (step S7 shown in FIG. 5), and when the repeater 2 receives any packets (step S7: YES), the CPU 31 determines whether or not the received packet is a respondence packet (step S8).

When the packet received in the step S7 is a respondence packet (step S8: YES), the CPU 31 acquires a recipient ID contained in the respondence packet (step S9), causes the output unit 28 to transmit a calling packet to a repeater 2 specified by the recipient ID through the network I/F 24 (step S10), and terminates the repeater reception selective process.

Conversely, when the received packet is a respondence packet (step S8: NO), the CPU 31 determines whether or not the packet received in the step S7 is a calling packet (step S11). When the received packet is a calling packet (step S11: YES), the CPU 31 sets the reception flag provided in the RAM 33 to be ON (step S12), and acquires a recipient ID contained in the calling packet (step S13). The CPU 31 causes the transmission unit 27 to transmit a calling signal to a handset device 3 specified by the recipient ID (step S14), and terminates the repeater reception selective process.

When determining that the repeater 2 does not receive any packets in the step S7 (step S7: NO), the CPU 31 determines whether or not the repeater 2 receives a response (answerback) from a handset device 3 to which the calling signal has transmitted in the step S5 or S14 (step S15 shown in FIG. 6).

When the repeater 2 has received the response (answerback) (step S15: YES), the CPU 31 determines whether or not the repeater 2 receives a calling packet based on whether or not the reception flag is ON (step S116).

When determining that the repeater 2 does not receive a calling packet since the reception flag is OFF in the step S16 (step S16: NO), the CPU 31 determines that both a transmission-source handset device 3 and a transmission-destination handset device 3 are present in the same communication area of the local repeater 2 and a communication is established between both handset devices 3, and directly terminates the repeater reception selective process.

Conversely, when determining that the repeater 2 receives a calling packet since the reception flag is ON (step S16: YES), the CPU 31 clears the reception flag to set it to be OFF (step S17), and acquires a sender repeater ID from the calling packet received in the step S7 (step S18). Thereafter, the CPU 31 causes the output unit 28 to transmit a response (answerback) to a repeater 2 specified by the sender repeater ID through the network I/F 24 (step S19).

When determining that the repeater 2 does not receive a response (answerback) in the step S15, the CPU 31 determines whether or not the repeater 2 receives a response (answerback) from a repeater 2 which has transmitted the calling packet in the step S10 (step S20).

When the repeater 2 does not receive a response (answerback) (step S20: NO), the CPU 31 directly terminates the repeater reception selective process. Conversely, when the repeater 2 receives a response (answerback) (step S20: YES), the CPU 31 acquires a sender ID from the calling packet (step S21), causes the transmission unit 27 to transmit a response (answerback) to a handset device 3 specified by the sender ID (step S22), and then terminates the repeater reception selective process. Accordingly, a communication is established between a transmission-source handset device 3 and a transmission-destination handset device 3.

Figure 4:
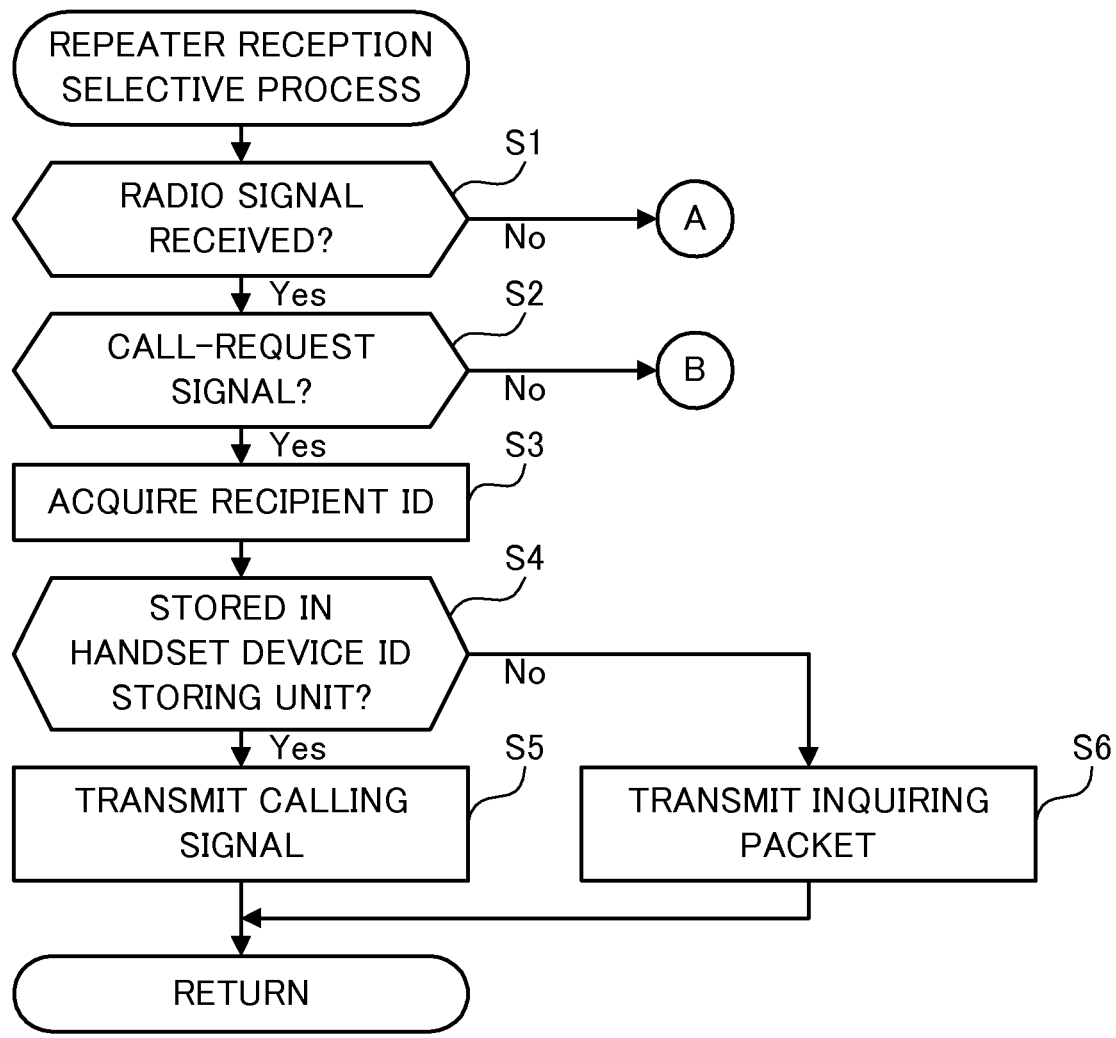
FIG. 4 is a flowchart showing an example of a repeater reception selective process.
Figure 5:
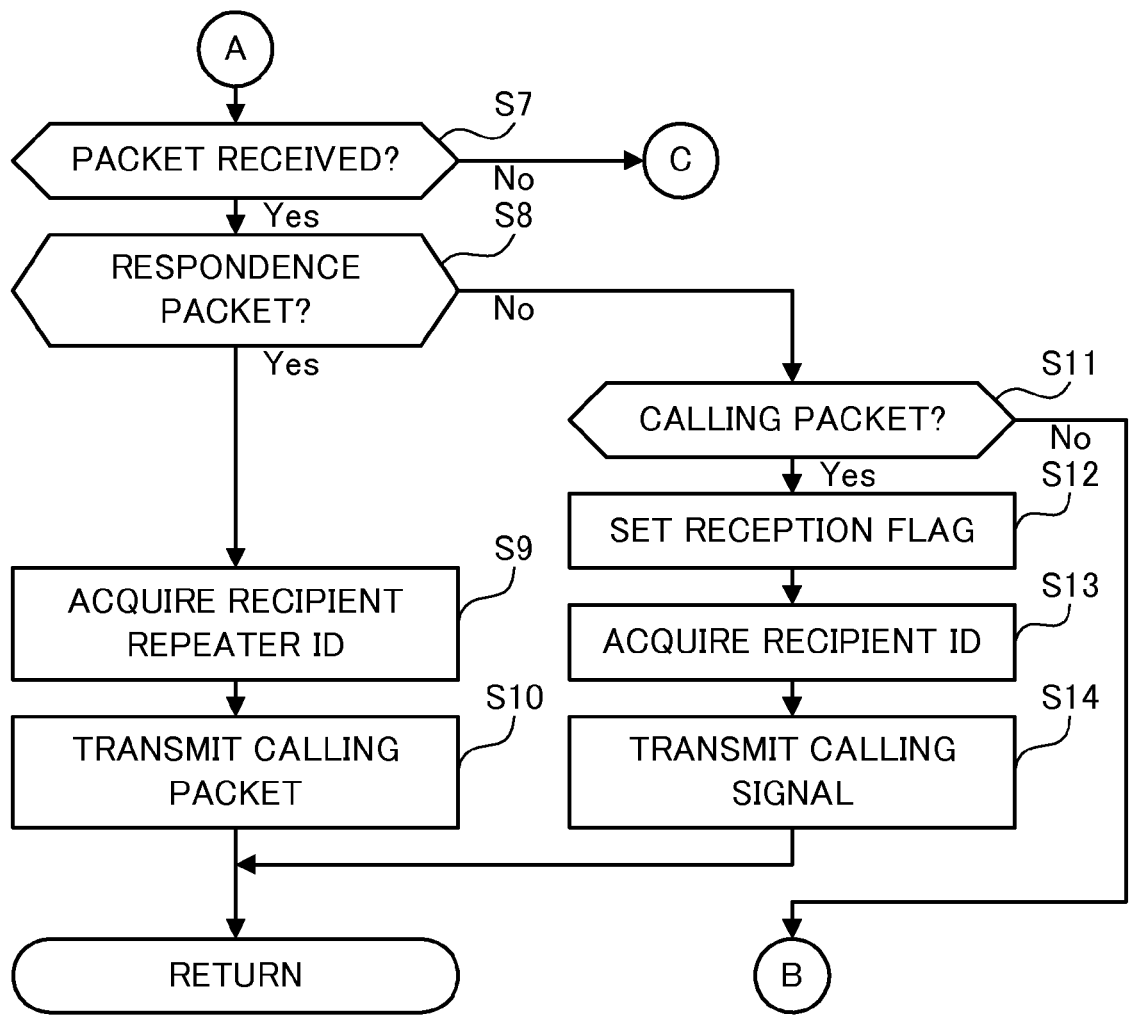
FIG. 5 is a flowchart showing an example of a repeater reception selective process.
Figure 6:
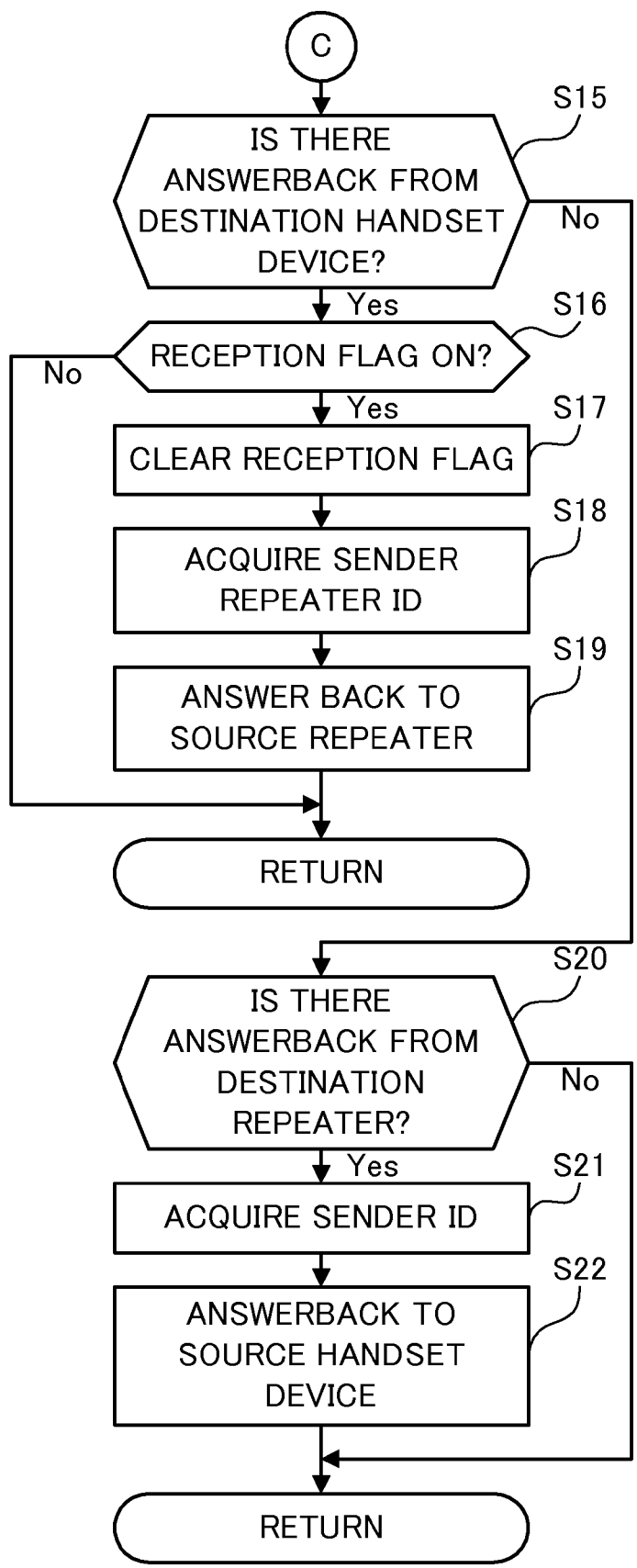
FIG. 6 is a flowchart showing an example of a repeater reception selective process.

When determining in the step S2 shown in FIG. 4 that a radio signal is not a call-request signal (step S2: NO) and when determining in the step S11 shown in FIG. 5 that a packet is not a calling packet (step S11: NO), the CPU 31 determines that the repeater 2 receives a voice packet or a communication information packet containing the content of a voice packet, and causes the first baseband process unit 23 to extract communication data from the voice packet and causes the input unit 25 to extract communication data from the communication information packet, respectively (step S23 shown in FIG. 7).

The CPU 31 causes the second baseband process unit 26 to assemble a voice packet from the communication data (step S24), and determines whether or not the memory flag in the RAM 33 is ON, thereby determining whether or not the packet storing unit 61 stores a voice packet (step S25).

When the memory flag is OFF and the CPU 31 determines that the packet storing unit 61 does not store a voice packet (step S25: NO), the CPU 31 sets the memory flag to be ON (step S26), and the flow goes to step S34.

Conversely, when the memory flag is ON and the CPU 31 determines that the packet storing unit 61 stores a voice packet (step S25: YES), the CPU 31 causes the packet selection unit 62 to compare the voice packet assembled by the second baseband process unit 26 with the voice packet stored in the packet storing unit 61, thereby acquiring the matching rate between those voice packets (step S27).

The CPU 31 determines whether or not the matching rate between those voice packets is greater than or equal to the reference value, thereby determining whether or not both voice packets match (step S28).

When both voice packets match (step S28: YES), the CPU 31 discards the voice packet assembled by the second baseband process unit 26 in order to suppress any redundant transmission of the voice packet (step S29).

Conversely, when both voice packet do not match (step S28: NO), the CPU 31 acquires sender IDs contained in respective voice packets (step S30), and determines whether or not both sender IDs match (step S31).

When the sender IDs of both voice packets match (step S31: YES), the CPU 31 discards the voice packet stored in the packet storing unit 61 to make such a voice packet out of the comparison target (step S33). Note that the voice packet made out of the comparison target is also stored in a transmission buffer provided in the transmission unit 27, so that there would be no problem even if the voice packet is discarded from the packet storing unit 61.

After the step S26 or the step S33, or, when determining that the sender IDs of both voice packets do not match (step S31: NO), the CPU 31 executes a next-packet process to be discussed later (step S34).

After the step S29 or the step S34, the CPU 31 put the voice packet stored in the packet storing unit 62 into a transmission queue, and executes a packet transmitting process of causing the transmission unit 27 to appropriately transmit the voice packet to a handset device 3 specified by the recipient ID (step S35), and then terminates the repeater reception selective process.

Figure 8:
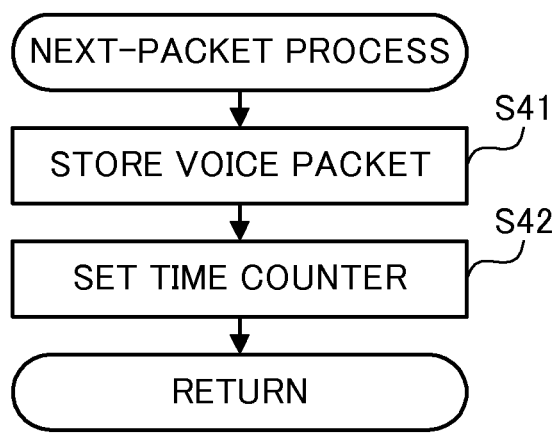
FIG. 8 is a flowchart showing an example of a next-packet process.

FIG. 8 is a flowchart showing an example of the next-packet process. In the next-packet process, first, the CPU 31 stores a voice packet assembled by the second baseband process unit 26 in the packet storing unit 61 (step S41). Next, the CPU 31 causes the time counter to start up from an initial value provided in the RAM 33 or the like to start counting the time from when the voice packet is stored in the packet storing unit 61 (step S42), and then terminates the next-packet process.

FIG. 9 is a flowchart showing an example of a packet time-discarding process. In the packet time-discarding process, first, the CPU 31 determines whether or not the memory flag provided in the RAM 33 is ON (step S51).

When the memory flag is OFF (step S51: NO), the CPU 31 determines that no voice packet is stored in the packet storing unit 61, and terminates the packet time-discarding process.

Conversely, when the memory flag is ON (step S51: YES), the CPU 31 determines whether or not a count value in the time counter (hereinafter, time count value) provided in the RAM is "0" which is an end value (step S52).

When the time count value is not "0" (step S52: NO), the CPU 31 directly terminates the packet time-discarding process.

Conversely, when the time count value is "0" (step S52: YES), the CPU 31 discards the voice packet stored in the packet storing unit 61 to make the voice packet out of the comparison target (step S53), clears the memory flag to set it to be OFF (step S54), and terminates the packet time-discarding process.

Subsequently, an explanation will be given of a communication procedure in the wireless communication system 5 having the plural repeaters 2 which execute the foregoing operation, with reference to accompanying drawings.

Figure 10:
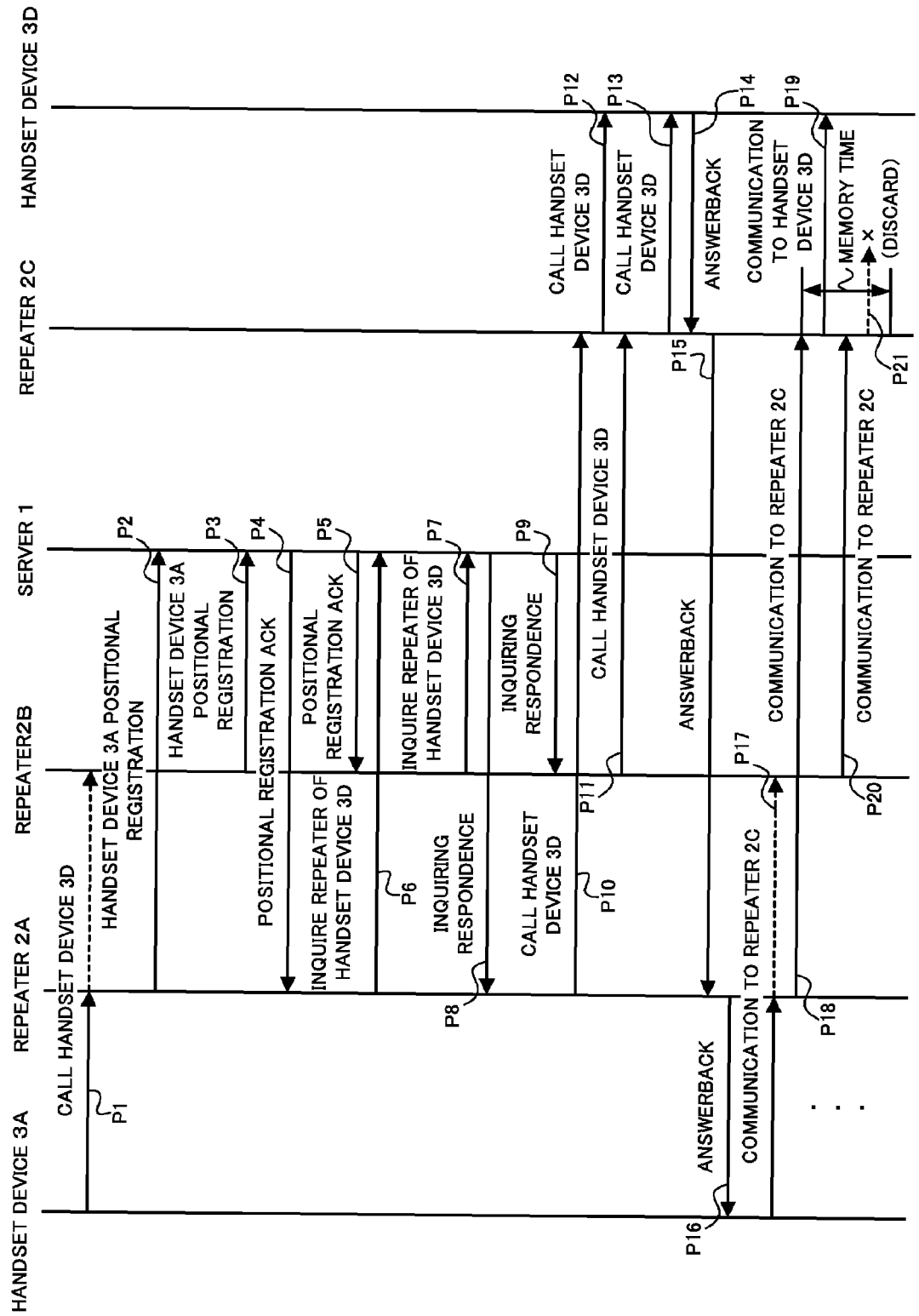
FIG. 10 is a diagram for explaining an example of a communication procedure in the wireless communication system.

FIG. 10 is a diagram for explaining one specific example of a communication procedure in the wireless communication system 5. In a case where a communication between the handset device 3A and the handset device 3D is to be established, e.g., in a case where the handset device 3A calls the handset device 3D, the handset device 3A transmits a call-request signal containing the ID of the handset device 3A as a sender ID and the ID of the handset device 3D as a recipient ID (procedure P1).

When receiving the call-request signal, the repeater 2A determines whether or not the ID of the handset device 3A contained in the call-request signal as the sender ID is stored in the handset device ID storing unit 20A. When the ID of the handset device 3A is not stored in the handset device ID storing unit 20A, the repeater 2A transmits a registration packet containing the ID of the handset device 3A to the server 1 (procedure P2). Conversely, when the ID of the handset device 3A is stored in the handset device ID storing unit 20A, the repeater 2A skips the transmission of a registration packet.

Like the repeater 2A, when receiving a call-request signal, the repeater 2B determines whether or not the ID of the handset device 3A is stored in the handset device ID storing unit 20B, and when it is not stored, the repeater 2B transmits a registration packet containing the ID of the handset device 3A to the server 1 (procedure P3).

As the server 1 receives the registration packet from the repeater 2A, the server 1 registers the ID of the handset device 3A, contained in the registration packet, in association with the ID of the repeater 2A in positional information stored in the positional information storing unit 10. Thereafter, the server 1 transmits a positional information ACK (acknowledgement) to the repeater 2A (procedure P4).

Moreover, as the server 1 receives the registration packet from the repeater 2B, the server 1 registers the ID of the handset device 3A in association with the ID of the repeater 2B in positional information, and then transmits a positional information ACK (acknowledgement) to the repeater 2B, too (procedure P5). Note that when the server 1 receives the registration packet from the repeater 2B following to the registration packet from the repeater 2A, the server 1 may execute a process of suppressing any redundant registration of the ID of the handset device 3A, registered in association with the ID of the repeater 2A in positional information, in association with the ID of the repeater 2B.

As the repeater 2A receives the positional information ACK from the server 1, the repeater 2A transmits an inquiring packet containing the ID of the handset device 3D as a recipient ID to the server 1 in the step S6 shown in FIG. 4 (procedure P6).

Moreover, as the repeater 2B receives the positional information ACK from the server 1, like the repeater 2A, the repeater 2B transmits an inquiring packet containing the ID of the handset device 3D as a recipient ID to the server 1 in the step S6 (procedure P7).

As the server 1 receives the inquiring packet from the repeater 2A, the server 1 detects the ID of the repeater 2C registered in association with the ID of the handset device 3D contained in the inquiring packet in the positional information stored in the positional information storing unit 10, and transmits a respondence packet containing the ID of the repeater 2C as a recipient ID to the repeater 2A (procedure P8).

As the server 1 receives the inquiring packet from the repeater 2B, the server 1 detects the ID of the repeater 2C registered in association with the ID of the handset device 3D in the positional information, and also transmits a respondence packet containing the ID of the repeater 2C as a recipient ID to the repeater 2B (procedure P9).

As the repeater 2A receives the respondence packet from the server 1 (step S8: YES in FIG. 5), the repeater 2A transmits a calling packet containing the ID of the handset device 3D as a recipient ID to the repeater 2C specified by the recipient ID contained in the respondence packet in the step S10 (procedure P10). In this case, the repeater 2A may broadcast the calling packet over the network 4, or may transmit the calling packet to the repeater 2C.

As the repeater 2B receives the respondence packet from the server 1 (step S8: YES), the repeater 2B transmits a calling packet containing the ID of the handset device 3D as a recipient ID to the repeater 2C in the step S10 (procedure P11).

As the repeater 2C receives the calling packet from the repeater 2A (step S11: YES), the repeater 2C transmits a calling signal to the handset device 3D specified by the recipient ID contained in the calling packet in the step S14 (procedure P12).

Moreover, as the repeater 2C receives the calling packet from the repeater 2B (step S11: YES), the repeater 2C transmits a calling signal to the handset device 3D in the step S14 (procedure P13).

As the handset device 3D receives the calling signal transmitted in the procedure P12, since the calling signal contains the ID of the handset device 3D as the recipient ID, the handset device 3D returns a response (answerback) to the repeater 2C (procedure P14). Accordingly, a communication between the repeater 2C and the handset device 3D is established and started.

As the repeater 2C receives the response from the handset device 3D (step S15: YES), the repeater 2C responds (answerback) to the transmission-source repeater 2A of the calling packet in the step S19 (procedure P15).

As the repeater 2A receives the response from the repeater 2C (step S20: YES), the repeater 2A responds (answerback) to the transmission-source handset device 3A of the call-request signal in the step S22 (procedure P16). Accordingly, a communication is established between the handset device 3A and the handset device 3D via the repeater 2A and the repeater 2C.

Conversely, the handset device 3D does not respond even if the handset device 3D receives the calling signal transmitted in the procedure P13. However, since the repeater 2B has already acquired the ID of the handset device 3D as the recipient ID from the respondence packet in the procedure P11, it is possible to transmit a communication information packet containing the content of a voice packet received from the handset device 3A to the repeater 2C. Accordingly, a communication via the repeater 2A and the repeater 2C and a communication via the repeater 2B and the repeater 2C are redundantly established between the handset device 3A and the handset device 3D.

When a communication is established between the handset device 3A and the handset device 3D, the handset device 3A transmits a voice packet to the repeater 2A and the repeater 2B (procedure P17).

The repeater 2A transmits a communication information packet containing the content of the voice packet received from the handset device 3A to the repeater 2C (procedure P18).

As the repeater 2C receives the communication information packet from the repeater 2A (step S11: YES), the repeater 2C assembles a voice packet from the communication information packet, stores the voice packet in the packet storing unit 61, and then transmits the voice packet to the handset device 3D in the steps S23 to S34 (procedure P19).

Moreover, the repeater 2B also transmits a communication information packet containing the content of the voice packet received from the handset device 3A to the repeater 2C (procedure P20).

However, as the repeater 2C receives the communication information packet from the repeater 2A (step S11: YES), since the voice packet assembled from the communication information packet matches the voice packet stored in the packet storing unit 61, the repeater 2C discards the voice packet so as not to transmit the voice packet redundantly to the handset device 3D in the steps S23 to S34 (procedure P21).

As explained above, according to the wireless communication system 5 of the embodiment, even if the voice packets from the same transmission-source handset device 3 are redundantly transmitted via plural communication paths, a repeater having a communication area where a transmission-destination handset device 3 is present transmits either one of the voice packets redundantly transmitted to the transmission-destination handset device 3, and discards another voice packet, thereby suppressing any redundant transmission of the same voice packet to the transmission-destination handset device 3.

Moreover, by employing such a scheme, even if the plural repeaters 2 are set to have the simultaneous communication channels with the same frequency, it is possible to suppress any redundant transmission of the voice packet to a transmission-destination handset device 3, so that the simultaneous communication channels having the limited number can be efficiently used and a simultaneous communication channel can be selected with the degree of freedom of selection.

When the plural repeaters 2 are set to have the simultaneous communication channels at the same frequency, even if a transmission-source handset device 3 moves to a communication area of another repeater 2, it is not necessary to switch a simultaneous communication channel, so that it is possible to realize a smooth handover in which voice communication is not interrupted.

The present invention is not limited to the foregoing embodiment, and can be changed and modified in various forms. Hereinafter, modified embodiments of the foregoing embodiment acceptable in the present invention will be explained.

Figure 7:
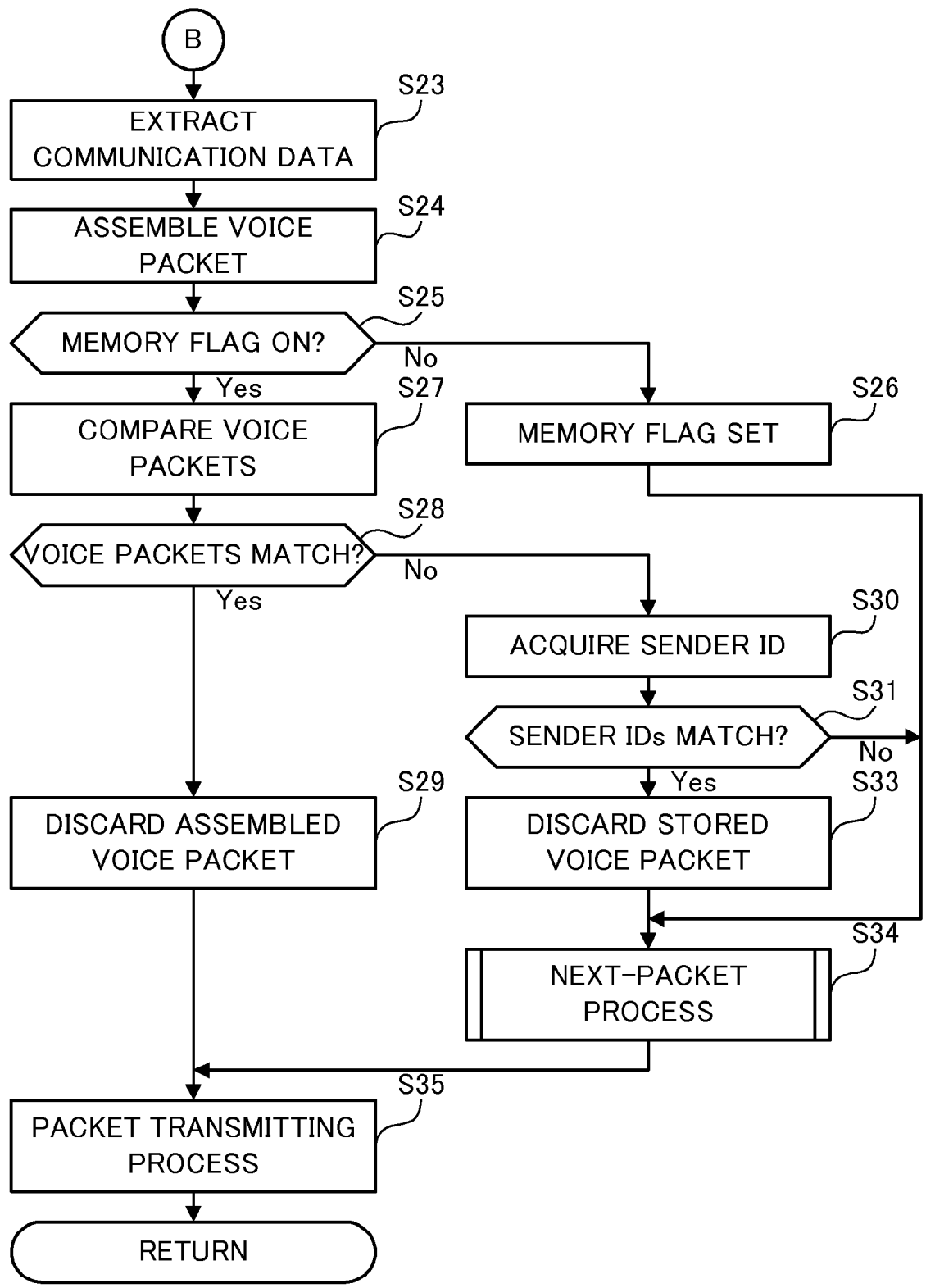
FIG. 7 is a flowchart showing an example of a repeater reception selective process.

In the foregoing embodiment, the explanation has been given of the case where the CPU 31 discards a voice packet assembled by the second baseband process unit 26, i.e., a voice packet received later in the step S29 shown in FIG. 7 when the voice packet assembled in the second baseband process unit 26 and the voice packet stored in the packet storing unit 61 match.

However, the present invention is not limited to this case, and when a voice packet stored in the packet storing unit 61, i.e., a voice packet received in first has not been transmitted yet, respective error rates of a voice packet assembled by the second baseband process unit 26 and the voice packet stored in the packet storing unit 61 is acquired, and such error rates of both voice packets are compared with each other. When the voice packet assembled by the second baseband process unit 26, i.e., the voice packet received later has a lower error rate than the voice packet stored in the packet storing unit 61, i.e., the voice packet received in first, the voice packet stored in the packet storing unit 61 may be replaced.

Specifically, an unsent flag or an in-transmission flag may be provided in the RAM 33. The unsent flag is set to be ON when a voice packet is put into a transmission queue, and is cleared to be OFF when the transmission of the voice packet is started. The in-transmission flag is set to be ON when the transmission of the voice packet is started, and is cleared to be OFF when the transmission of the voice packet is completed.

In this case, in the repeater reception selective process, when the CPU 31 determines that both voice packet match (step S28: YES shown in FIG. 7), a packet discarding process shown in FIG. 11 may be executed instead of the step S29. Moreover, in the packet transmitting process of the step S34, when a voice packet stored in the packet storing unit 62 is put into the transmission queue, a process of setting the unsent flag provided in the RAM 33 to be ON may be executed.

Figure 12:
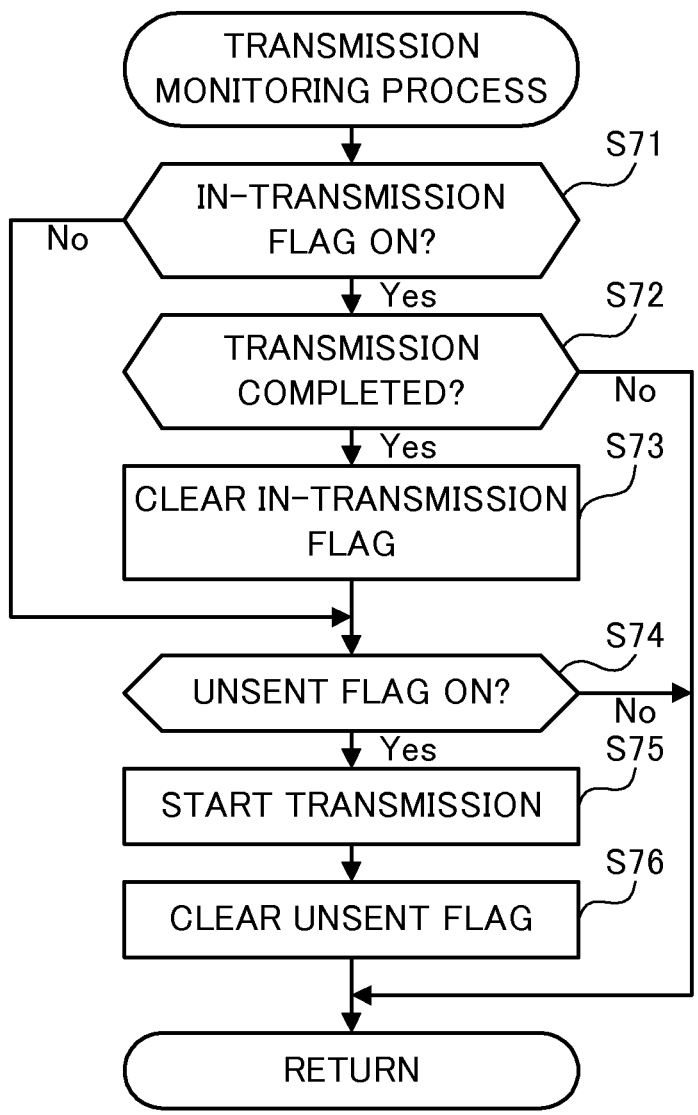
FIG. 12 is a flowchart showing an example of a transmission monitoring process.
Figure 13:
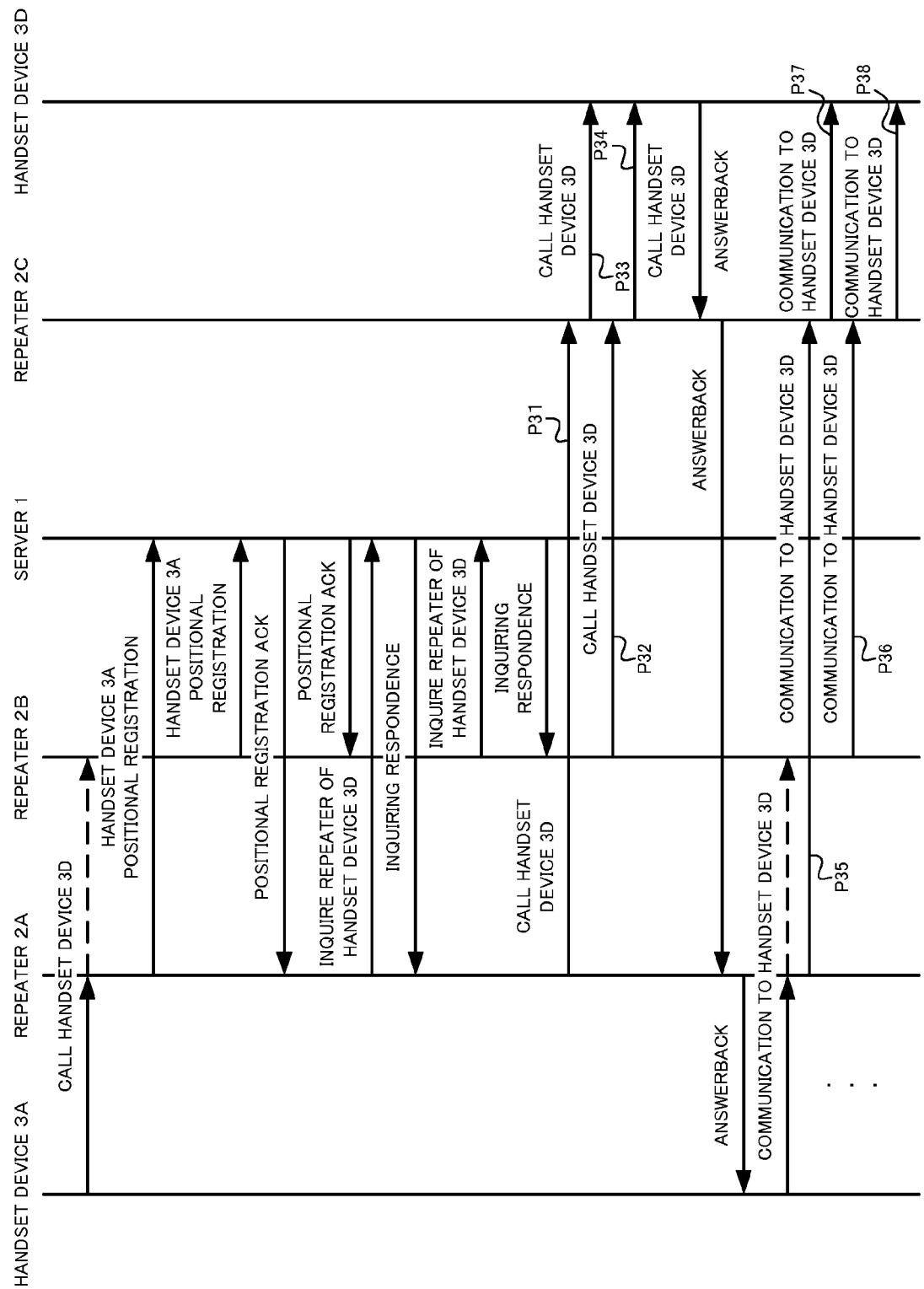
FIG. 13 is a diagram for explaining an example of a communication procedure in a conventional wireless communication system.

In the redundant transmission preventive operation, a transmission monitoring process shown in FIG. 12 of monitoring the state of a voice packet put into the transmission queue may be executed not in synchronization with the packet transmitting process in the step S34.

Figure 11:
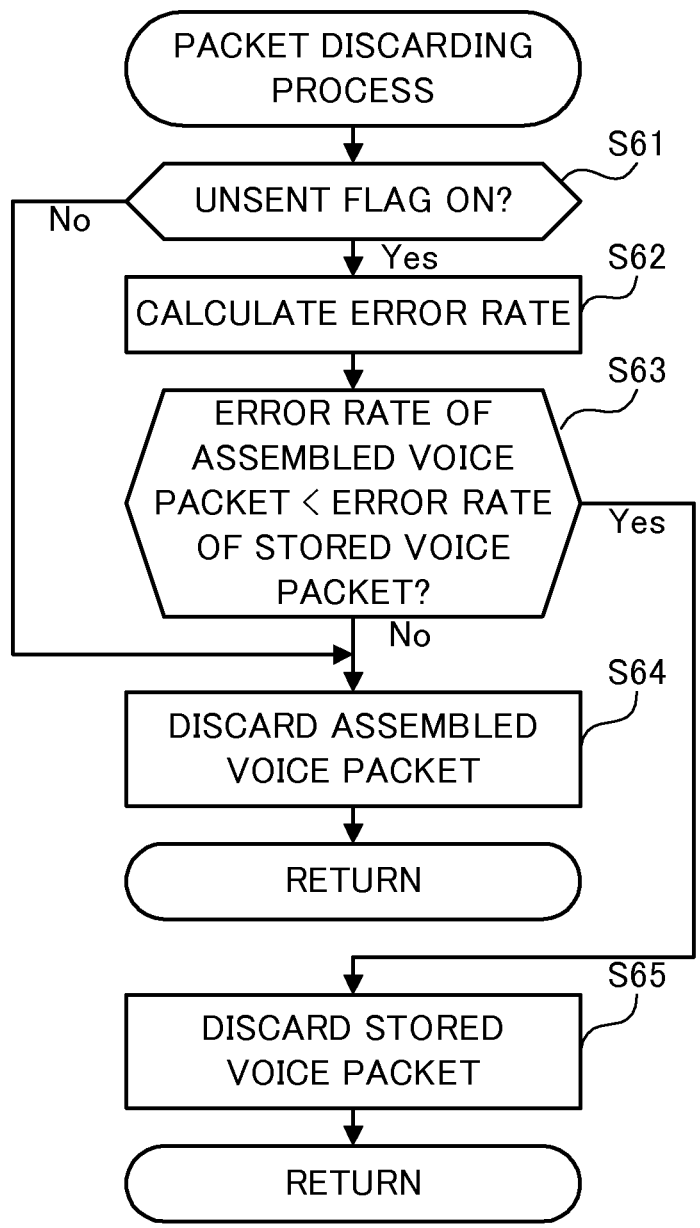
FIG. 11 is a flowchart showing a modified example of the packet discarding process.

FIG. 11 is a flowchart showing an example of the packet discarding process. In the packet discarding process, first, the CPU 31 determines whether or not the unsent flag in the RAM 33 is ON (step S61).

When the unsent flag is ON (step S61: YES), the CPU 31 acquires respective error rates of a voice packet stored in the packet storing unit 61 and a voice packet assembled by the second baseband process unit 62 (step S62).

The CPU 31 compares the error rates of both voice packets with each other, thereby determining whether or not the voice packet assembled by the second baseband process unit 26 has a lower error rate than the error rate of the voice data stored in the packet storing unit 61 (step S63).

When determining in the step S61 that the unsent flag is OFF (step S61: NO) or when determining in the step S63 that the voice packet stored in the packet storing unit 61 has a lower error rate than the error rate of the voice packet assembled by the second baseband process unit 26 (step S63: NO), the CPU 31 discards the voice packet assembled by the second baseband process unit 26, i.e., the voice packet received later (step S64).

Conversely, when the voice packet assembled by the second baseband process unit 26 has a lower error rate than the error rate of the voice packet stored in the packet storing unit 61 (step S63: YES), the CPU 31 replaces the voice packet stored in the packet storing unit 61 with the voice packet assembled by the second baseband process unit 26, thereby discarding the voice packet stored in the packet storing unit 61, i.e., the voice packet received at first (step S65).

FIG. 12 is a flowchart showing an example of a transmission monitoring process. In the transmission monitoring process, first, the CPU 31 determines whether or not the in-transmission flag provided in the RAM 33 is ON, thereby determining whether or not the transmission unit 27 is transmitting a voice packet (step S71). When determining that the transmission unit 27 is transmitting the voice packet since the in-transmission flag is ON (step S71: YES), the CPU 31 determines whether or not the transmission of the voice packet is completed (step S72).

When the transmission of the voice packet from the transmission unit 27 is not completed (step S72: NO), the CPU 31 directly terminates the transmission monitoring process. Conversely, when the transmission of the voice packet is completed (step S72: YES), the CPU 31 clears the in-transmission flag to set it to be OFF (step S73).

When determining in the step S71 that the in-transmission flag is OFF (step S71: NO), or after the step S73, the CPU 31 determines whether or not the unsent flag in the RAM 33 is ON, thereby determining whether or not there is an unsent voice packet in the transmission queue (step S74).

When determining that no unsent voice packet is in the transmission queue since the unsent flag is OFF (step S74: NO), the CPU 31 directly terminates the transmission monitoring process. Conversely, when determining that there is an unsent voice packet in the transmission queue since the unsent flag is ON (step S74: YES), the CPU 31 starts transmitting the voice packet (step S75), and clears the unsent flag to set it to be OFF (step S76).

As explained above, according to the wireless communication system 5 of the modified embodiment, when a voice packet stored in the packet storing unit 61 is in an unsent condition, it is possible to select a voice packet having a low error rate between a voice packet assembled by the second baseband process unit 26 and the voice packet stored in the packet storing unit 61. Accordingly, it is possible to leave a voice packet having a better path quality in the packet storing unit 61, resulting in a smooth handover.

In the foregoing embodiment, the server 1 is a structural component of the wireless communication system 5. However, the present invention is not limited to this structure, and in the case of a wireless communication system 5 employing a simple structure, the server 1 may be omitted.

For example, in the wireless communication system 5, when the repeater 2A to 2D that each handset device 3A to 3F can use for relaying is set beforehand and a repeater 2A to 2D has the ID of a handset device 3 stored in the handset device ID storing unit 20A to 20D of another repeater 2A to 2D beforehand, it becomes unnecessary to acquire a recipient repeater ID, so that the server 1 can be omitted.

Moreover, a transmission-source repeater 2A to 2D does not transmit a communication information packet to a repeater 2A to 2D specified by a transmission-destination address, but broadcasts the communication information packet. Conversely, another repeater 2A to 2D compares a recipient ID contained in the communication information packet with the ID of a handset device 3A to 3F stored in a handset device ID storing unit 20A to 20D, thereby determining whether or not the ID of a handset device 3A to 3F matching the recipient ID is stored. A repeater 2A to 2D storing the ID of a handset device 3A to 3F matching the recipient ID receives the communication information packet, and a repeater 2A to 2D not storing the ID of a handset device 3A to 3F matching the recipient ID does not receive the communication information packet. According to such a structure, the wireless communication system 5 does not need the server 1.

Further, in the wireless communication system 5, each repeater 2A to 2D transmits the ID of a handset device 3A to 3F stored in a handset device ID storing unit 20A to 20D to another repeater 2A to 2D periodically or when the ID of a handset device 3A to 3F stored in a handset device ID storing unit 20A to 20D is updated, and requests the ID of a handset device 3A to 3F stored in a handset device ID storing unit 20A to 20D of a transmission-source repeater 2A to 2D when transmitting a communication information packet. According to such a structure, the server 1 can be omitted.

In the foregoing embodiment, the repeater 2A to 2D performs both uplinking and downlinking in the same device. However, the present invention is not limited to this case, and the repeater 2A to 2D may perform uplinking and downlinking with different devices, and those devices may be connected together over a network.

The present invention can be arbitrarily applied to a wireless communication system which performs data communication using packets, but is appropriate for such a wireless communication system 5 according to the foregoing embodiment having the limited number of simultaneous communication channels and transmitting/receiving, for example, a voice data which can be relatively easily controlled.

In addition, the hardware structures and the flowcharts in the foregoing embodiment are examples, and can be changed and modified arbitrarily.

The controller 30 of the repeater 2 comprising the CPU 31, the J/O device 32, the RAM 33, and the ROM 34 is not limited to an exclusive system, and can be realized using a general-purpose computer system. For example, a computer program for executing the foregoing operation may be stored in a computer-readable recording medium (a flexible disk, a CD-ROM, a DVD-ROM, or the like) and distributed, and, installed in a computer, thereby constituting the repeater 2 executing the foregoing process. The computer program may be stored in a memory device of a server device over a communication network like the Internet, and a general-purpose computer may download the program, thereby configuring the repeater 2 executing the foregoing process.

Further, when the function of the repeater 2 is sheared by an OS (Operating System) and an application program, or is realized by the cooperation of the OS and the application program, only the application program portion may be stored in a recording medium or a memory device.

The computer program may be superimposed on a carrier wave, and such a carrier wave may be broadcasted over a communication network. For example, the computer program may be put on a BBS (Bulletin Board System) over the communication network, and may be distributed via the network. The computer program may be activated and executed like another application program under the control of the OS, thereby executing the foregoing process.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2008-116925 filed on Apr. 28, 2008, and including specification, claims, drawings and summary. The disclosure of the above Japanese Patent Application is incorporated herein by reference in its entirety.

What is claimed is:

1. A repeater connected to a network and relaying a communication of a wireless communication device, the repeater comprising:

a packet reception unit that receives a packet transmitted from a sender wireless communication device to a recipient wireless communication device from the network or the sender wireless communication device;

a transmission unit that transmits the packet received by the packet reception unit to the recipient wireless communication device which is a transmission destination;

a packet storing unit that stores, as a first packet, all of or a predetermined part of the packet transmitted to the recipient wireless communication device; and a packet selection unit that compares all of or a predetermined part of the first packet stored by the packet storing unit with all of or a predetermined part of a second packet, other than the first packet received by the packet reception unit, and discards the second packet when the first and second packets match under a predetermined condition;

wherein when the packet reception unit receives a second packet which has the same sender as the first packet and which does not match the first packet under a predetermined condition, the packet selection unit excludes all of or a predetermined part of the stored first packet from a comparison target with all of or a predetermined part of the second packet, and wherein when the packet reception unit receives a second packet matching the first packet under a predetermined condition prior to transmitting the first packet, the packet selection unit compares an error rate of the first packet with an error rate of the second packet, and replaces the first packet stored in the packet storing unit with the second packet when the second packet has a smaller error rate than the error rate of the first packet.

2. The repeater according to claim 1, wherein the packet selection unit determines that the first packet and the second packet match when a rate that all of or a predetermined part of the first packet and all of or a predetermined part of the second packet match is greater than or equal to a predetermined value.

3. The repeater according to claim 1, wherein when a predetermined time elapses after the packet storing unit stores the first packet, the packet selection unit excludes all of or a predetermined part of the stored first packet from a comparison target with all of or a predetermined part of the second packet.

4. A method of controlling a repeater which is connected to a network and which relays a communication of a wireless communication device, the method comprising:

a packet reception step of receiving a packet transmitted from a sender wireless communication device to a recipient wireless communication device from the network or the sender wireless communication device;

a transmission step of transmitting the packet received in the packet reception step to the recipient wireless communication device;

a packet storing step of storing, as a first packet, all of or a predetermined part of the packet transmitted to the recipient wireless communication device; and a packet selection step of comparing all of or a predetermined part of the first packet stored in the packet storing step with all of or a predetermined part of a second packet, other than the first packet received in the packet reception step, and discarding the second packet when the first and second packets match under a predetermined condition;

wherein when the packet reception step receives a second packet which has the same sender as the first packet and which does not match the first packet under a predetermined condition, the packet selection step excludes all of or a predetermined part of the stored first packet from a comparison target with all of or a predetermined part of the second packet and wherein when the packet reception step receives a second packet matching the first packet under a predetermined condition prior to transmitting the first packet, the packet selection step compares an error rate of the first packet with an error rate of the second packet, and replaces the first packet stored in the packet storing step with the second packet when the second packet has a smaller error rate than the error rate of the first packet.

5. A wireless communication system comprising sender and recipient repeaters connected to a network, and sender and recipient wireless communication devices which communicate with each other via the repeaters, wherein:

the network transmits data or a packet between the sender and recipient repeaters;

the sender repeater comprises:

a reception unit that receives a packet transmitted from the sender wireless communication device to the recipient wireless communication device;

an acquisition unit that acquires identification information of the recipient repeater having a communication area where the recipient wireless communication device which is a destination of the packet received from the sender wireless communication device is present; and a transmission unit that transmits the received packet to the recipient repeater specified by the identification information acquired by the acquisition unit via the network when the recipient repeater specified by the identification information differs from itself; and the recipient repeater comprises:

a packet reception unit that receives a packet transmitted from the sender wireless communication device to the recipient wireless communication device from the network or the sender wireless communication device;

a transmission unit that transmits the packet received by the packet reception unit to the recipient wireless communication device which is a destination of the packet;

a packet storing unit that stores, as a first packet, all of or a predetermined part of the packet transmitted to the recipient wireless communication device; and a packet selection unit that compares all of or a predetermined part of the first packet stored by the packet storing unit with all of or a predetermined part of a second packet, other than the first packet received by the packet reception unit, and discards the second packet when the first and second packets match under a predetermined condition;

wherein when the packet reception unit receives a second packet which has the same sender as the first packet and which does not match the first packet under a predetermined condition, the packet selection unit excludes all of or a predetermined part of the stored first packet from a comparison target with all of or a predetermined part of the second packet and wherein when the packet reception unit receives a second packet matching the first packet under a predetermined condition prior to transmitting the first packet, the packet selection unit compares an error rate of the first packet with an error rate of the second packet, and replaces the first packet stored in the packet storing unit with the second packet when the second packet has a smaller error rate than the error rate of the first packet.

6. The wireless communication system according to claim 5, further comprising a positional information server that communicates with the repeaters, and wherein the positional information server comprises:

a positional information storing unit that stores identification information of the recipient wireless communication device in association with identification information of the recipient repeater which can communicate with the recipient wireless communication device;

a reception unit that receives an inquiry of searching identification information of the recipient repeater having a communication area where the recipient wireless communication device which is a destination of the packet is present from the sender repeater;

a respondence unit that transmits identification information of the recipient repeater which can communicate with the recipient wireless communication device to the repeater which transmits the inquiry when the inquiry is received, the identification information being stored in the positional information storing unit and corresponding to identification information of the recipient wireless communication device contained in the inquiry; and the acquisition unit of the sender repeater transmits an inquiry of searching identification information of the recipient repeater having a communication area where the recipient wireless communication device which is a destination of the packet is present to the positional information server, and acquires, from the positional information server, identification information of the recipient repeater having a communication area where the recipient wireless communication device is present.

7. A non-transitory computer-readable recording medium storing a control program for a repeater connected to a network and relaying a communication of a wireless communication device, the control program allowing a computer to function as:

a packet reception unit that receives a packet transmitted from a sender wireless communication device to a recipient wireless communication device from the network or the sender wireless communication device;

a transmission unit that transmits the packet received by the packet reception unit to the recipient wireless communication device which is a destination of the packet;

a packet storing unit that stores, as a first packet, all of or a predetermined part of the packet transmitted to the recipient wireless communication device; and a packet selection unit that compares all of or a predetermined part of the first packet stored by the packet storing unit with all of or a predetermined part of a second packet, other than the first packet received by the packet reception unit, and discards the second packet when the first and second packets match under a predetermined condition;

wherein when the packet reception unit receives a second packet which has the same sender as the first packet and which does not match the first packet under a predetermined condition, the packet selection unit excludes all of or a predetermined part of the stored first packet from a comparison target with all of or a predetermined part of the second packet, and wherein when the packet reception unit receives a second packet matching the first packet under a predetermined condition prior to transmitting the first packet, the packet selection unit compares an error rate of the first packet with an error rate of the second packet, and replaces the first packet stored in the packet storing unit with the second packet when the second packet has a smaller error rate than the error rate of the first packet.

* * * * *